United States Patent [19]
Claps

[11] Patent Number: 5,890,855
[45] Date of Patent: Apr. 6, 1999

[54] METHOD AND APPARATUS FOR TRANSPORTING CARS

[76] Inventor: William R. Claps, 35 Bedford St., Apt 23, New York, N.Y. 10014

[21] Appl. No.: 918,792

[22] Filed: Aug. 26, 1997

Related U.S. Application Data

[63] Continuation-in-part of Ser. No. 390,743, Feb. 17, 1995, Pat. No. 5,690,453, which is a continuation-in-part of Ser. No. 228,091, Apr. 15, 1994, Pat. No. 5,489,171.

[51] Int. Cl.$^6$ ........................................................ B60P 3/08
[52] U.S. Cl. .............................. 410/26; 414/498; 410/24
[58] Field of Search .................... 410/26, 4, 13, 410/28, 29.1; 414/498

[56] References Cited

U.S. PATENT DOCUMENTS

| | | |
|---|---|---|
| 3,675,795 | 7/1972 | Dluhy . |
| 4,124,119 | 11/1978 | Nordstrom . |
| 4,668,141 | 5/1987 | Petersen . |
| 4,668,142 | 5/1987 | Fity et al. . |
| 4,730,562 | 3/1988 | Baker et al. ............... 410/26 |
| 4,768,916 | 9/1988 | Gearin et al. . |
| 4,917,557 | 4/1990 | Kato et al. . |
| 4,919,582 | 4/1990 | Bates et al. . |
| 4,963,067 | 10/1990 | Gearin et al. . |
| 5,040,935 | 8/1991 | Gearin et al. . |
| 5,051,046 | 9/1991 | Oren . |
| 5,054,987 | 10/1991 | Thorton . |
| 5,067,862 | 11/1991 | Andre . |
| 5,213,458 | 5/1993 | Preller et al. . |
| 5,253,975 | 10/1993 | Takaguchi . |
| 5,286,149 | 2/1994 | Seoy et al. ............... 410/26 |
| 5,297,908 | 3/1994 | Knott . |
| 5,332,345 | 7/1994 | Lillard . |
| 5,344,266 | 9/1994 | Kolb . |
| 5,427,485 | 6/1995 | Henderson et al. ............... 410/26 |
| 5,429,474 | 7/1995 | Knott ............... 410/26 |
| 5,489,171 | 2/1996 | Claps et al. ............... 410/26 |

FOREIGN PATENT DOCUMENTS

| | | |
|---|---|---|
| 1220973 | 1/1960 | France . |
| 898554 | 11/1953 | Germany . |
| 1052909 | 3/1959 | Germany . |
| 3443662 | 6/1986 | Germany . |
| 209225 | 8/1989 | Japan . |
| WO 81 01997 | 7/1981 | WIPO . |

*Primary Examiner*—Thomas J. Brahan
*Assistant Examiner*—Gregory A. Morse
*Attorney, Agent, or Firm*—Baker & Botts, L.L.P.

[57] ABSTRACT

A pallet apparatus for transporting stacked cars has upper and lower pallets connected by four columns. The upper pallet is attached at an adjustable height and angle relative to the lower pallet. A diagonal brace is connected between each column and the lower pallet at a height greater than the highest point of attachment for the upper pallet on the column. A method of using the device is also claimed.

14 Claims, 25 Drawing Sheets

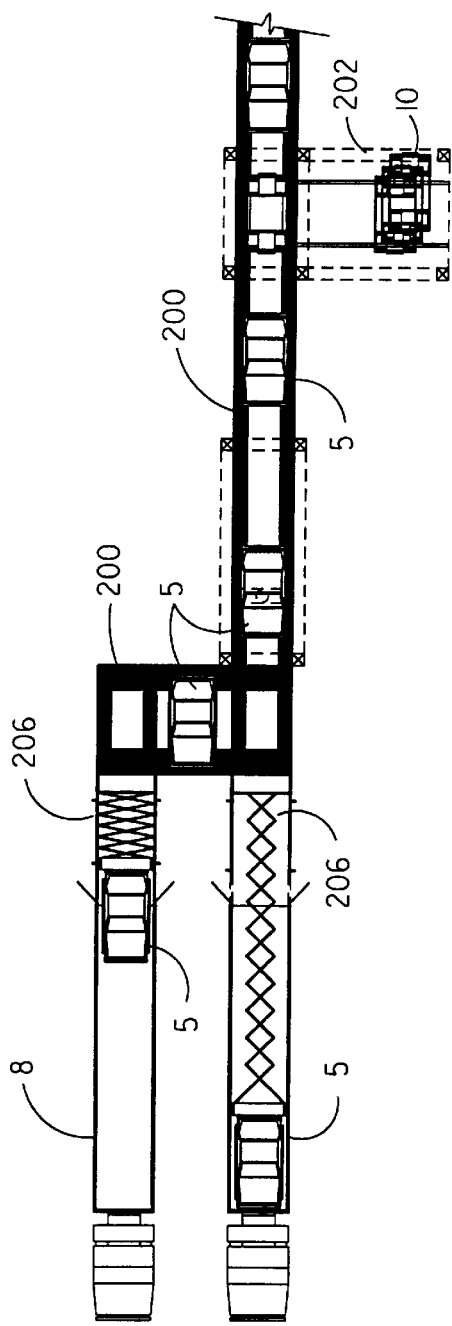
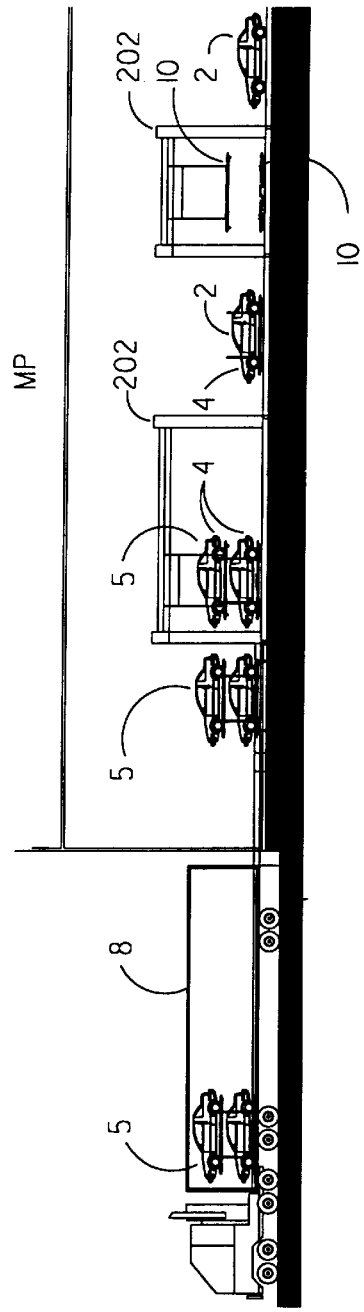
FIG.2
FIG.3

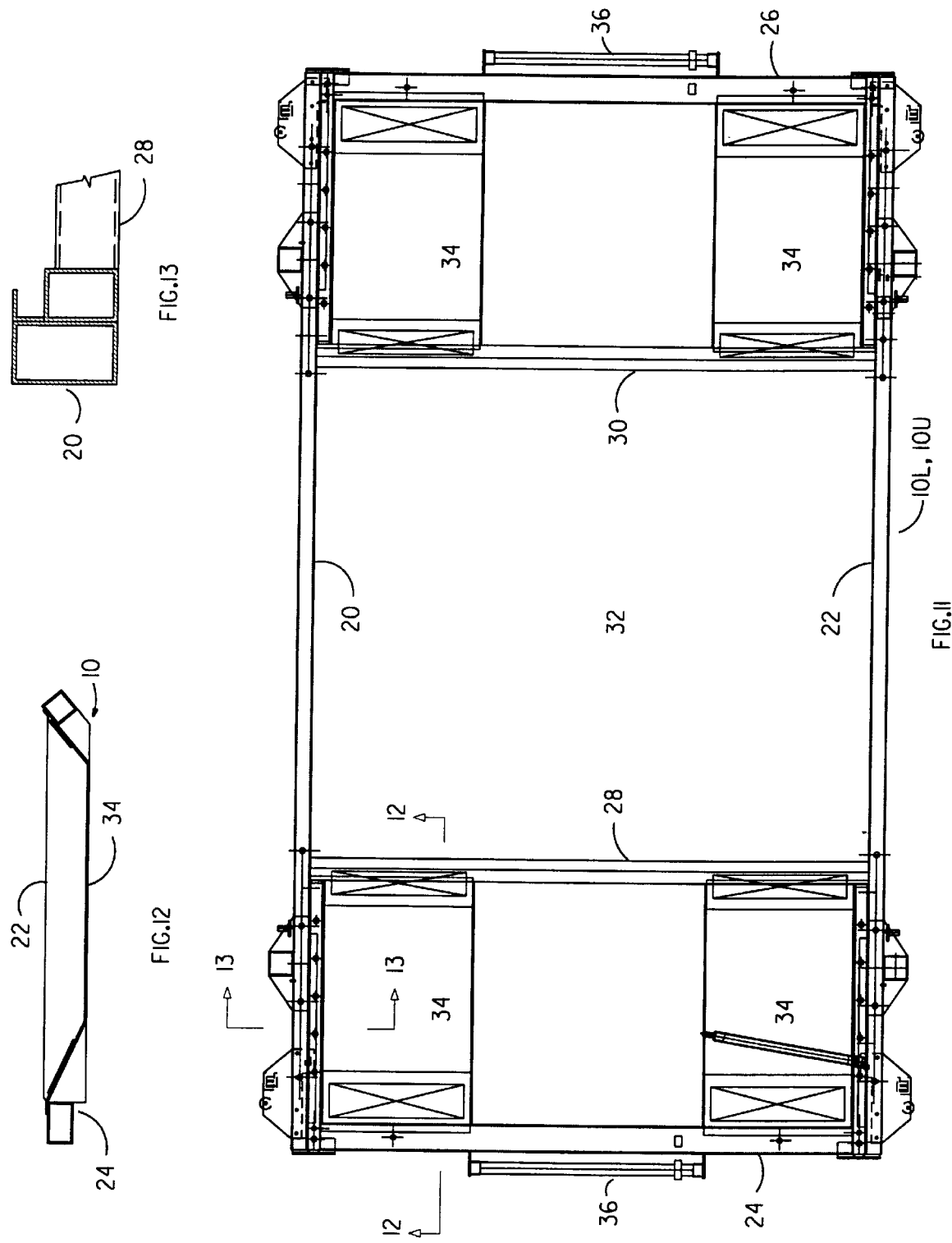

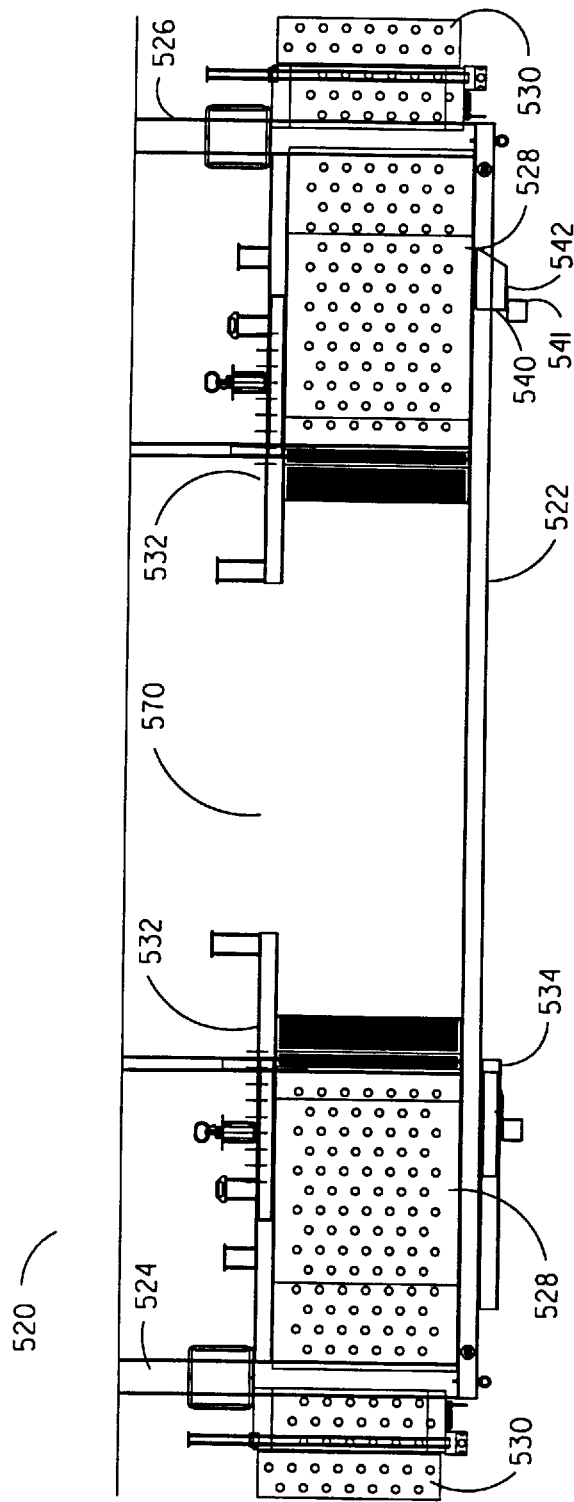
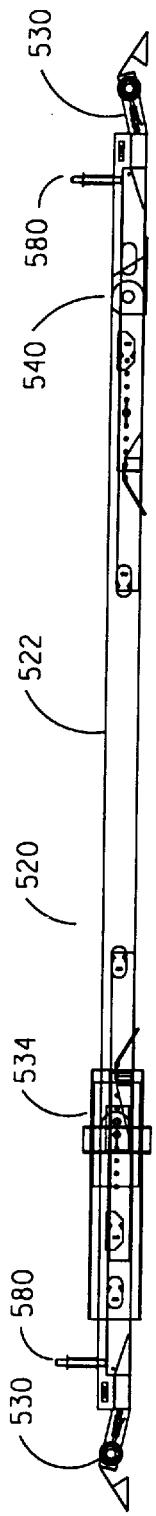
FIG.36
FIG.37

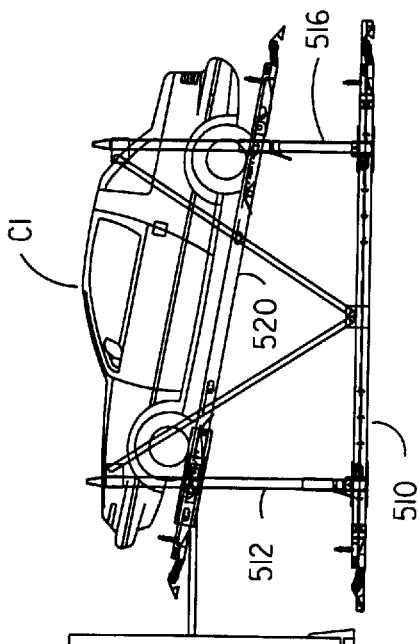
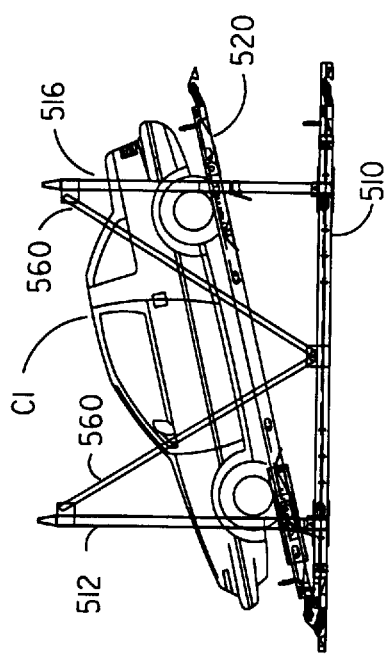
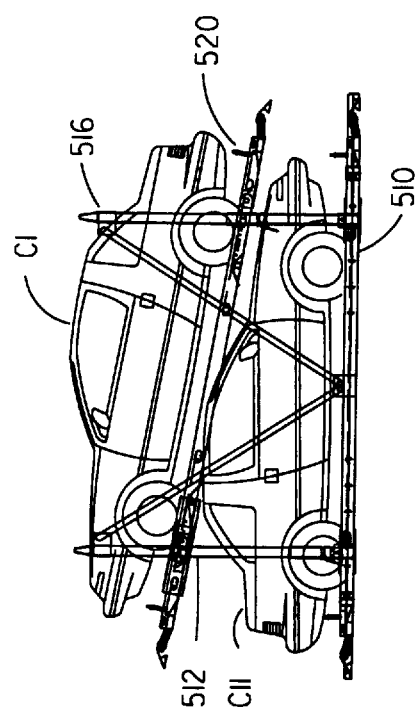

5,890,855

METHOD AND APPARATUS FOR TRANSPORTING CARS

The present application is a continuation-in-part of U.S. patent application Ser. No. 08/390,743 filed Feb. 17, 1995, now U.S. Pat. No. 5,690,453, issued Nov. 25, 1997 which is a continuation-in-part of U. S. Patent Application Ser. No. 08/228,091 filed Apr. 15, 1994, now U. S. Pat. No. 5,489,171 issued Feb. 6, 1996.

BACKGROUND OF THE INVENTION

Automobile assembly plants are generally located long distances from the markets where the cars will be sold. Although many cars are transported from the plant on highway car carriers to nearby dealers, say dealers up to about 250 miles from the plant, the majority of cars manufactured in the U.S., Mexico, and Canada are moved by bi-level or tri-level autorack rail cars from the plant to a central distribution point, where they are then driven off the rail cars, stored temporarily, and driven onto highway car carriers for transport to dealers. The term "cars" is used herein to refer not only to passenger automobiles but to station wagons, pick-up trucks, sport vehicles, and vans, and, more generally, to all motor vehicles generally comparable in size to passenger automobiles.

The traditional modes of transport for the car industry have a number of disadvantages. Moving cars from the assembly line to temporary storage lots, then to the rail and truck loading facilities, and subsequent movements at distribution centers is highly labor intensive - people have to drive the cars to a destination and return for more cars. Damage due to human contact is a major problem. Because the cars have to be driven onto and off of the rail cars and car carriers, driven in storage lots and parked in tight places, damage to doors and damage from occasional collisions with parked cars are common. The doors of cars in transit from assembly plants to dealers are ordinarily left unlocked and the keys are left in the cars for easy accessibility to the drivers who drive them when they are transferred to and from storage sites and transport vehicles. From time to time, persons enter the unlocked cars that are being transported and damage them. Also, the cars are exposed to the weather, hail being the most serious hazard, and to vandalism. There is, therefore, a need for a faster, safer and more economical means of transporting cars from assembly plants to dealers.

Another problem with the usual way in which cars are transported is that the autorack rail cars and highway car carriers are costly to manufacture and are unsuitable for transporting other cargo. The empty return trips from their destinations are wasteful of the equipment, the fuel consumed, the personnel, and the railways and roadways. There is, therefore, a need for providing for transport of cars by equipment that has cargo space suitable for transporting other cargo, not only when the rail cars and trailers are returned to their point of origin but for general use as well.

A number of attempts have been made to solve the problems discussed above. For example, Gearin et al. U.S. Pat. No. 5,040,935 describes and shows a system for loading and transporting cars inside shipping containers. The cars are loaded onto carrier racks outside the shipping container and then placed into the container, where they are protected from external hazards. While the transporter system disclosed in the Gearin patent has attained some limited acceptance commercially, the system has a number of problems. The Gearin system includes a highly complex, costly frame structure, which requires the use of equally complex loading and unloading facilities. The complex nature of the loading and unloading procedures also requires a significant amount of time. The system utilizes a large and bulky loading/unloading frame, which is difficult to work with. The large size of the Gearin loading frame does not lend itself to mass production.

Another Gearin patent, U.S. Pat. No. 4,768,916, discloses a collapsible frame system for loading cars into a shipping container. The Gearin frames are designed to collapse so that a number of the frames can be stored in the same shipping container on a return trip to the point of origin. A problem with this design, however, is that collapsing the frame involves a complex, multi-step procedure. Additionally, numerous components must be removed from the frame before it can be collapsed, and these components may be damaged or lost during a return trip to the point of origin.

Another system for transporting vehicles inside shipping containers has been proposed by J. B. Hunt. In the Hunt system, the frame which holds the cars is assembled inside the container, and the cars are then driven into the container and secured to the frame. The major disadvantage of this system is that after the cars are driven into the container, it is difficult for the drivers to exit the cars, and there is a danger that the car doors will be damaged from banging into the container walls.

Other systems for containerizing cars for shipment have been proposed. In general, such systems have been intended for overseas shipments on container ships. Containerization is not particularly useful in its previously known configurations for over-land transport of cars, inasmuch as it is usually not feasible to make up containers at an assembly plant having the mixes of cars that the dealers have ordered. Unloading and reloading containers at distribution centers to get the mixes of cars for the dealers using previously proposed systems is, as discussed above, labor-intensive, time-consuming, complicated and costly.

SUMMARY OF THE INVENTION

An object of the present invention is to provide a way of transporting cars from assembly plants to dealers that will reduce the risk of damage from the various hazards mentioned above. Another object is to reduce the overall costs of transportation of new cars from plants to dealers. Still another object is to shorten the time that cars are en route from assembly plants to dealers.

The foregoing and other objects are attained, in accordance with the present invention, by a method of transporting cars from an assembly plant to dealers. According to the invention, each car is loaded at the assembly plant or at a nearby loading facility individually onto a pallet on which the car is supported on its wheels and is secured to the pallet to form a palleted car unit. Also at or near the assembly plant, multiplicities of palleted car units are loaded into first closed housings to form first transportable units. Multiplicities of the first transportable units are then transported to a first distribution center remote from the assembly plant, where the palleted car units are removed from the first closed housings of the first transportable units. At least some of the palleted car units are allocated to selected dealers and loaded into the second closed housings to form second transportable units. The second transportable units are then transported from the distribution center to the selected dealers and unloaded.

One important aspect of the present invention is that the cars are placed individually on and secured to pallets at the assembly plant and remain on the pallets until they arrive at the dealers' lots. They are never driven and are protected from damage caused by careless drivers, intruders, weather, and vandals. The method is amenable to a high degree of automation of conveying and loading equipment at the assembly plant and the distribution centers, thus reducing labor costs, saving time, and minimizing accidents. The palleted car units are also relatively easy to handle, which allows the use of relatively simple equipment for loading, unloading and moving them, not only at the plants and distribution centers but at the dealers. The ease of handling of the palleted car units also facilitates phasing in a system based on the method in stages. In that regard, the palleted cars can, for example, be carried in conventional highway trailers with only minor modifications to the trailers.

In the majority of cases, the first closed housings into which the palleted car units are loaded at the assembly plants are portions of railroad cars, and the first transportable units are moved to the distribution center by rail. The distribution center usually receives cars from numerous assembly plants, and after unloading those cars are allocated for reshipment, either to satellite distribution centers, usually by rail, or to dealers by truck. In the latter case, the second closed housings are portions of highway trailers adapted to be towed by tractors, and the second transportable units are moved to the selected dealers over roadways.

In some embodiments, at least some of the pallets have supporting wheels and palleted car units having pallets with supporting wheels are moved into the first closed housings by rolling along tracks in the first closed housings, such as by endless flexible traction drives installed in the first closed housings.

In an advantageous form of the invention, at least some of the pallets of the palleted car units have upwardly extending columns, and a palleted car unit is assembled in stacked relation over each palleted car unit having columns and is supported by the columns to form a stack of two palleted car units. Each stack of two palleted car units is moved into one of the first closed housings at the plant. By providing each pallet that has columns with supporting wheels, or providing roller beds in the first closed housings, each stack of two palleted car units can be moved into a first closed housing by rolling along tracks in the first closed housing, such as by at least one endless flexible traction drive installed in the first closed housing. It is also possible to form stacks of three palleted car units to increase the loading of each rail car. When the palleted car units are to be transported by highway truck, they are reconfigured to form stacks of two. Similarly, depending on the mixes of cars to be dispatched from the distribution center, some of the stacks of two palleted car units removed from the first closed housings at the distribution center may be unstacked, and after allocation new stacks of two palleted car units are assembled and loaded into second closed housings, which will usually be portions of highway trailers.

There is also provided, according to another aspect of the invention, apparatus for transporting cars from an assembly plant to dealers comprising a plurality of pallets, each adapted to support a car on its wheels in secured relation, and a railway car having a closed housing adapted to receive a plurality of pallets, spaced apart longitudinally extending tracks within the closed housing, rollers interposed between the pallets and the tracks along which the pallets roll when moved into and out of the railway car, and an endless flexible traction drive for connection to each pallet seriatim for moving the plurality of pallets into the closed housing one after the other in end to end relation.

The endless traction drive, preferably, includes an endless flexible member guided along a predetermined path lengthwise of the rail car and having spaced-apart lugs, each engageable with a pallet. Advantageously, the traction drive may include a flexible member associated with each track and located below the pallets as they move along the tracks, a drive wheel associated with each flexible member and a common drive shaft on which the drive wheels are affixed and extending to a coupling portion adjacent a wall of the housing and adapted to be coupled to a rotary power source.

The flexible member of the traction drive may be a drive chain, which is located below the pallets as they move along the tracks and includes an inclined lead-in portion at one end in which the chain moves up to engage the lugs with the pallets and an inclined lead-out portion at the other end in which the chain moves down to release the lugs from the pallets. By providing the drive chain with pairs of longitudinally spaced apart lugs, each pair being engageable with longitudinally spaced-apart sockets on a pallet, each pallet can be pulled into the closed housing by a front lug of a lug pair and pushed out of the closed housing by a rear lug of a lug pair.

In a preferred embodiment of the apparatus, some of the pallets have upwardly extending columns, which support one or two other pallets to produce a two-tier or three-tier assembly of pallets stacked one above the other.

The invention is susceptible of a wide range of modifications and variations. For example, as suggested above, rollers on which the pallets move into and out of the closed housings may be provided on the pallets or as roller beds in the housings. It is believed that providing them on the pallets is better, primarily because that requires fewer rollers in total and reduces considerably the cost and complexity of the tracks in the housings. The rollers on the pallets also facilitate moving the pallets in other places.

It is also believed that the two or three tier stacks of pallets, each pallet carrying one car, provide the least costly way of providing two-tier or three-tier transport of the cars, inasmuch as only one level of conveying and traction apparatus is required in the housings and the loading facilities. It is also, possible, however, to provide loading facilities and rail cars that enable individual palleted car units to be handled separately in two levels or three levels. The rail cars, in such arrangements, will have elevated tracks, will be served by elevated loading platforms, and will have traction drives at each level.

The individually palleted cars, assembled in stacks, can also be loaded into standard containers and transported by ship, as is well-known per se. The versatility of enabling the individual palleted car units to be transported in various closed housings and the ability to provide for transport from plant to dealer without being driven are highly advantageous, in that they ensure economical, rapid, low-cost and safe movement.

Another aspect of the invention is the structure and method of using a car transport rack, which is suited not only for carrying out the optimal transport method described above, in which the cars are not driven at any point while in transit between the assembly plant and the dealers, but for loading, transport and unloading in various ways, including driving the cars on and off the racks where relatively costly loading, moving and unloading apparatus for handling palleted car units is not available. In that regard, the optimal method described above requires a substantial investment in equipment and renders obsolete existing autorack rail cars and highway car carriers. Therefore, the present invention includes a car transport rack that can be used to great advantage immediately with relatively small investments in capital equipment. The car transport rack of the present invention is especially useful in that it can be loaded, moved, and unloaded easily without costly equipment and can be transported in existing intermodal containers and highway trailers.

There is provided, in particular according to the present invention, a car transport rack that comprises a lower pallet and an upper pallet, each pallet being adapted to support a car on its wheels and having side frame members, a front transverse frame member and a rear transverse frame member, the transverse frame members joining the side frame members. A front column is attached to each of the side members of the lower pallet proximate to the front transverse frame member, the front columns being located transversely opposite each other with respect to the side frame members. Similarly, a rear column is attached to each of the side members of the lower pallet proximate to the rear transverse frame member, the rear columns also being located transversely opposite each other with respect to the side frame members. An upper pallet front support bracket is received by each front column for movement to a position selected from a plurality of positions above the lower pallet and is coupled to the side frame member of the upper pallet for pivotal and sliding movement of the upper pallet relative to the front columns. An upper pallet rear support bracket is received by each rear column for movement to a position selected from a plurality of positions above the lower pallet and is coupled to the side frame member of the upper pallet for pivotal movement of the upper pallet relative to the front columns. Each of the support brackets is arranged to be secured to the receiving column at the selected position. A diagonal brace is connected between each column and the side frame member of the lower pallet to which that column is attached, an upper end of each diagonal brace being connected to the column at a location above all of the positions to which the upper pallet support bracket is movable so that the support braces do not interfere with movements of the upper pallet to a desired position for transport.

In preferred embodiments of the car transport rack, each column is attached to the side member of the lower pallet by a pivot coupling so that the column is collapsible, thus facilitating stacking of the pallets of disassembled racks for transport without cars from a destination where the cars are unloaded from the racks to a plant or distribution center where they will be erected and loaded with cars.

Each pallet, preferably, includes a wheel pan at each corner formed by junctures of the side frame members and end frame members. The lower pallet includes a wheel way extending between the wheel pans on each side and adjacent each side frame member for facilitating driving a car onto the lower pallet. The wheel ways of the lower pallet may be removable and shared with the upper pallet, as described below.

In preferred embodiments, the upper pallet has an opening defined by the side frame members and the wheel pans, which opening is adapted to receive an upper portion of a car on the lower pallet. The upper pallet has a wheel way extending between the wheel pans on each side and adjacent each side frame member for facilitating driving a car onto the upper pallet, the wheel ways being removable to form portions of the opening.

The positions to which the upper pallet front mounting brackets are movable include loading/unloading positions in which the front end of the upper pallet rests on the front end of the lower pallet and the upper pallet is inclined upwardly toward the rear end. In that position, a car can be driven onto the rack. The positions to which the upper pallet front and rear mounting brackets are movable also include transport positions in which the upper pallet is inclined upwardly from the rear end toward the front end. Inclining the upper pallet reduces the overall height of the loaded rack.

The upper and lower pallets may have mating pins and sockets enabling the pallets to be stacked for transport without cars.

Still another aspect of the invention is a method of transporting cars that includes the step of providing a multiplicity of car transport racks, each rack having the construction described above. The upper pallet of each rack is adjusted on the columns to a loading/unloading position in which the front end of the upper pallet rests on the lower pallet and the upper pallet is inclined upwardly from the front end. Next, a first car is driven onto the upper pallet of each rack and secured to the upper pallet. The front end of the upper pallet is then lifted up and the front mounting brackets are secured to the front columns in positions in which the upper pallet is inclined downwardly from front to rear. A second car is driven onto the lower pallet of each rack and secured to the lower pallet. Preferably, each first car is driven onto the upper pallet rear end first and each second car is driven onto the lower pallet front end first.

From one to four racks, depending on the size of the container, each loaded with cars, are moved into a closed housing of a transporter, which may be a rail car, an intermodal cargo container or a highway trailer. The transporter is moved to a destination, where the loaded racks are moved out of the container. The cars are driven off the racks in a procedure that is the reverse of the loading procedure. In particular, each car on a lower pallet is driven off the lower pallet of each rack, the front end of the upper pallet of each rack is lowered until the front end rests on the lower pallet, and the cars on the upper pallets are driven off.

In both loading cars onto and unloading cars from the racks, the front end of the upper pallet may have to be lifted up temporarily to leave a clearance for a car to be driven onto or off of the lower pallet.

In many cases transport racks may be loaded with cars at or near an assembly plant and the loaded racks transported in intermodal containers, highway trailers, or rail cars to a distribution center. After unloading the racks but without removing the cars, the racks can be remixed and loaded into the same or other containers, trailers or rail cars for transport to dealers or to another distribution center. Alternatively, the cars can be unloaded from the racks and loaded onto highway car carriers. After the racks are unloaded, they are disassembled, stacked, and returned to a loading facility.

The improved racks and the method of using them allows the use of simple devices, such as fork lifts, chain hoists, and cable winches, for setting up the pallets for loading and transport and for moving loaded pallets into and out of containers. It is also possible to incorporate lifting devices, such as worm screw jacks, into the rack. On the other hand, the racks can also be used with more elaborate loading and unloading installations, such as those that are highly automated and handle the palleted cars and do not require the cars to be driven according to the optimal method described generally above and in more detail below. The racks are relatively inexpensive to produce, easy to load, handle and unload, and highly versatile with respect to adjusting the configuration for various car models and use with closed containers of various sizes.

For a better understanding of the invention, reference may be made to the following description of an exemplary embodiment, taken in conjunction with the accompanying drawings.

DESCRIPTION OF THE DRAWINGS

FIGS. 2 and 3 are schematic side elevational and plan views of a loading facility at an assembly plant for staging and moving palleted car units into closed housings, in this example, highway trailers;

FIGS. 10 to 29 are drawings of an embodiment of a two-tier pallet unit, which when a car is in place on each pallet forms a two-tier assembly of two palleted car units, the views being as follows:

FIG. 10 a side elevational view;

FIG. 11 a top plan view;

FIG. 12 a partial side cross-sectional view of a pallet, taken along the lines 12—12 of FIG. 11;

FIG. 13 a partial end cross-sectional view of a pallet, taken along the lines 13—13 of FIG. 11;

FIG. 14 a side view of a lower column bracket;

FIG. 15 a top view of the lower column bracket;

FIG. 16 a top cross-sectional view of the lower column bracket, taken along the lines 16—16 of FIG. 14;

FIG. 17 a side view of an upper column bracket;

FIG. 18 an end view, looking at the left side of FIG. 17, of the upper column bracket;

FIG. 19 a top cross-sectional view of the upper column bracket, taken along the lines 19—19 of FIG. 17;

FIG. 20 a partial end elevational view of a two-tier assembly of pallets;

FIGS. 21 and 22 side and top views of a diagonal brace;

FIGS. 23 and 24 side and end views of a column;

FIG. 25 a side view of a column assembled to a lower column bracket;

FIG. 26 an end view of a pallet guide/roller assembly, which is shown as supported on a track and mounted on side members of a lower pallet;

FIG. 27 a top cross-sectional view of the guide/roller assembly of FIG. 24, taken along the lines 27—27 of FIG. 26;

FIG. 28 a top plan view of the guide/roller assembly;

FIG. 29 a side elevational view of the guide/roller assembly;

FIG. 36 is a top plan view of one lateral half of the upper pallet of the rack of FIG. 35;

FIG. 37 is a side elevational of the upper pallet of FIG. 36;

FIGS. 41A, 41B, and 41C are side elevational views of the rack of FIGS. 35 to 40, showing the sequence of loading the rack with cars;

DESCRIPTION OF THE EMBODIMENTS

Figure 1:
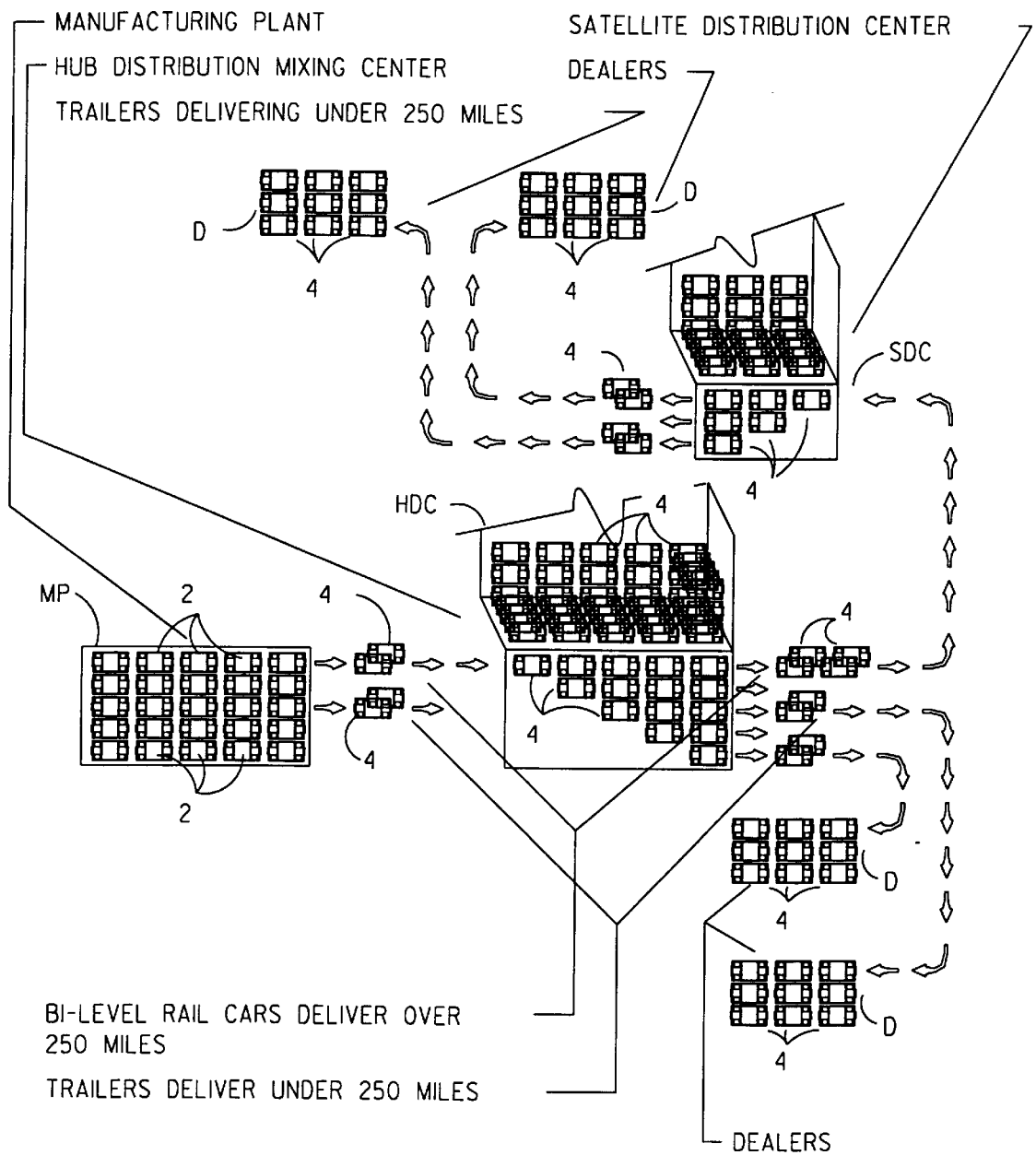
FIG. 1 is a pictorial flow diagram of a method embodying the present invention.

Referring to FIG. 1, finished cars 2 are loaded individually onto pallets (described below) at a leading facility at or near the Manufacturing Plant MP and remain on the pallets as palleted car units 4 through one or a series of unloading, allocation, reloading, and transport movements to Dealers. Some of the palleted car units 4 are transported by highway trailers to nearby Dealers D, this being generally the case for Dealers within about 250 miles from the plant MP. Most of the palleted car units 4 from each of several plants of a manufacturer or a group of manufacturers are transported in closed housings by rail, the closed housings being parts of rail cars or containers loaded onto flat bed rail cars, to a Hub Distribution Center HDC, where they are unloaded, stored temporarily and allocated for transport to one of a group of Satellite Distribution Centers SDC or to nearby Dealers. The allocated units 4 are loaded into second closed housings and transported, again by rail or truck, to the Satellite Distribution Centers or nearby Dealers. Palleted car units 4 delivered to the Satellite Distribution Centers are unloaded, allocated to dealers, loaded onto trucks and delivered to the Dealers.

There are many variables in how the overall process may be planned and executed. Generally, the concept of a hub and spokes distribution system, which is known per se, is to transport all units that are allocated to dealers more than a certain distance away from a plant to a centrally located hub distribution center. The units are unloaded and reallocated, some to nearby dealers and most to satellite distribution centers, which are located to serve regions (e.g., for the United States, northeast, southeast, midwest, etc.). One or more satellite centers may be at portside for allocation of units to container ships destined to overseas locations. In some cases, both hub and satellite centers may be joint ventures and handle cars from various manufacturers.

The predominant means for transporting the palleted car units 4 for distances of more than about 250 miles over land is by rail. As described below in more detail, the palleted car units 4 are loaded onto special rail cars 6 (FIGS. 4 to 6) or into containers that are loaded onto rail cars. When the cars are destined for export and will be transported overland from the plant MP and then loaded onto a ship, the palleted car units 4 may be placed in containers, either at the plant MP or at a portside facility. For transport to dealers D located less than about 250 miles from the plant MP, the units 4 are transported in closed highway trailers 8 (FIGS. 2, 3, 8 and 9) or in containers carried by flat bed highway trailers.

Figure 4:
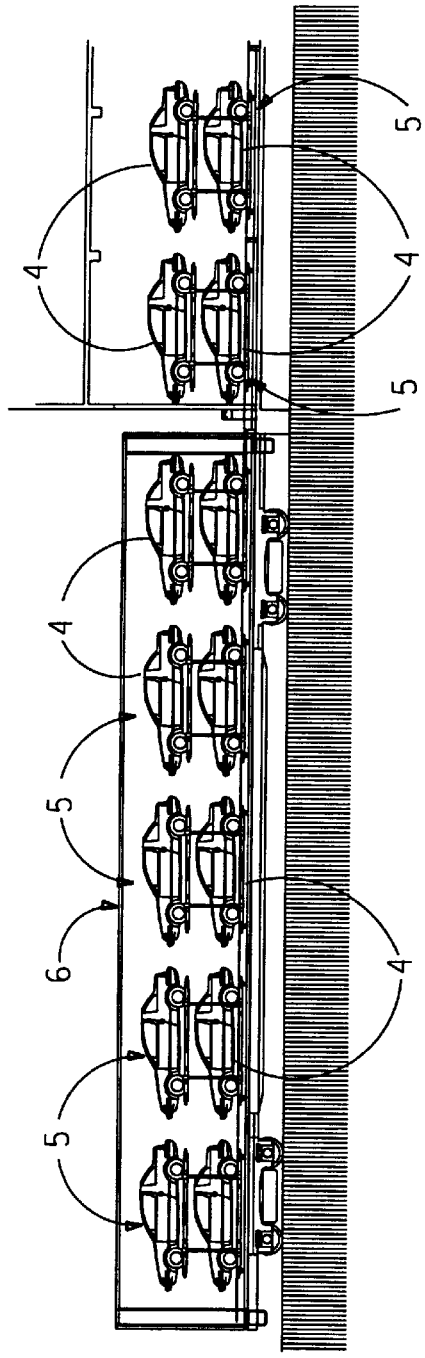
FIGS. 4 and 5 are side elevational and plan views of a facility for staging and loading palleted car units into rail cars in stacks of two.
Figure 5:
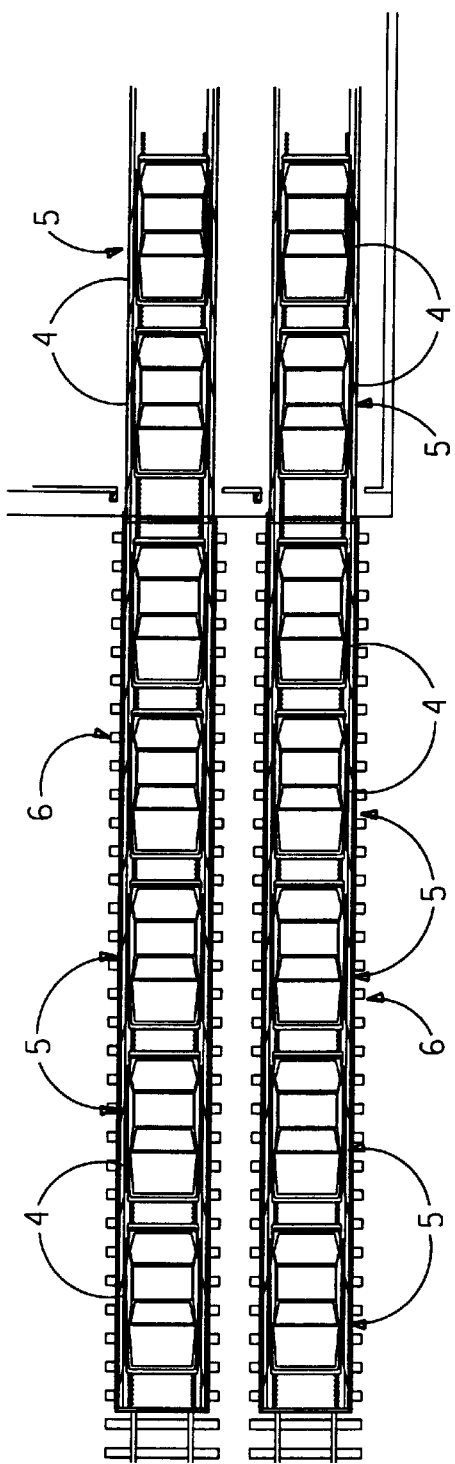
Figure 6:
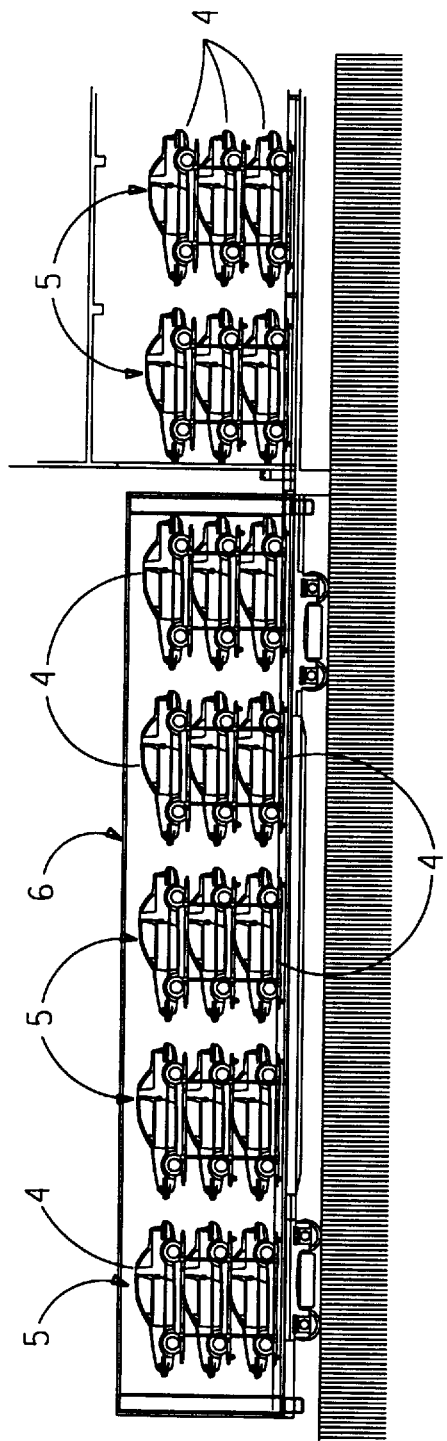
FIG. 6 is a side view of a facility for staging and loading palleted car units into rail cars in stacks of three.

The loading facility at or near the plant MP, as shown in FIGS. 2 and 3, has suitable automated conveyers 200 and overhead cranes 202 for bringing empty pallets (10, described below) to a loading station, loading cars 2 onto pallets, forming two-tier units 5, each consisting of two palleted car units 4 stacked one over the other, and moving the units 5 to a loading dock 204 where highway trailers 8 are waiting. An example of a loading device for loading two-tier units 5 into trailers 8 or containers is a long scissors jack 206, which pushes the two-tier units into the trailers or containers. Alternatively, two-tier units 5 or three-tier units 5' of palleted car units 4 can be assembled and loaded into closed rail cars at or near the plant, as shown in FIGS. 4 to 6. Apparatus for loading several rail cars 6 coupled together is described below. The loading facility at the plant MP shown in FIGS. 2 and 3 can be used to form the units 5 and 5' for loading onto rail cars.

Figure 7:
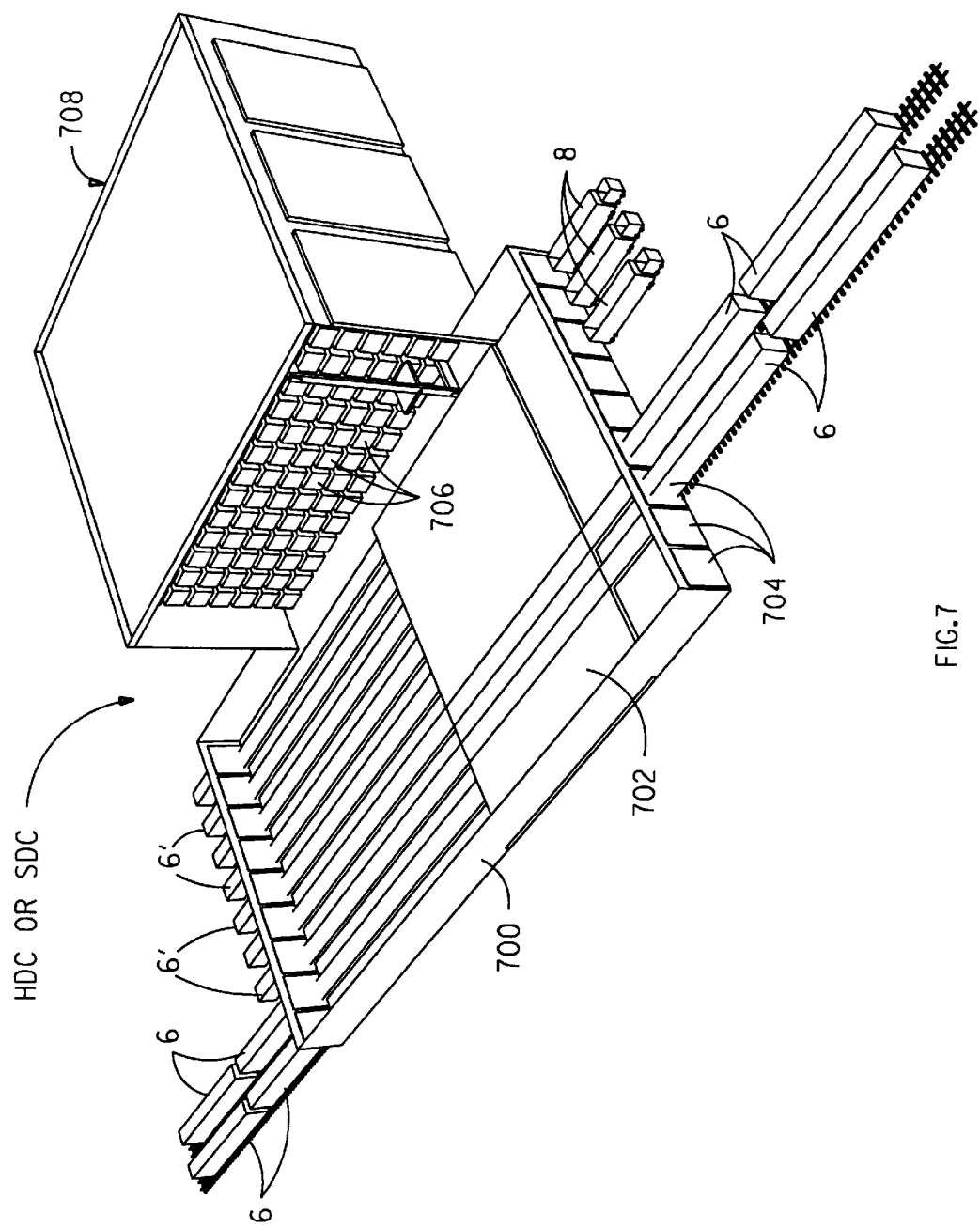
FIG. 7 is a pictorial view of a mixing and distribution terminal where palleted car units from several assembly plants are delivered, unloaded, allocated for delivery to dealers or regional sub-distribution centers, and reloaded.
Figure 8:
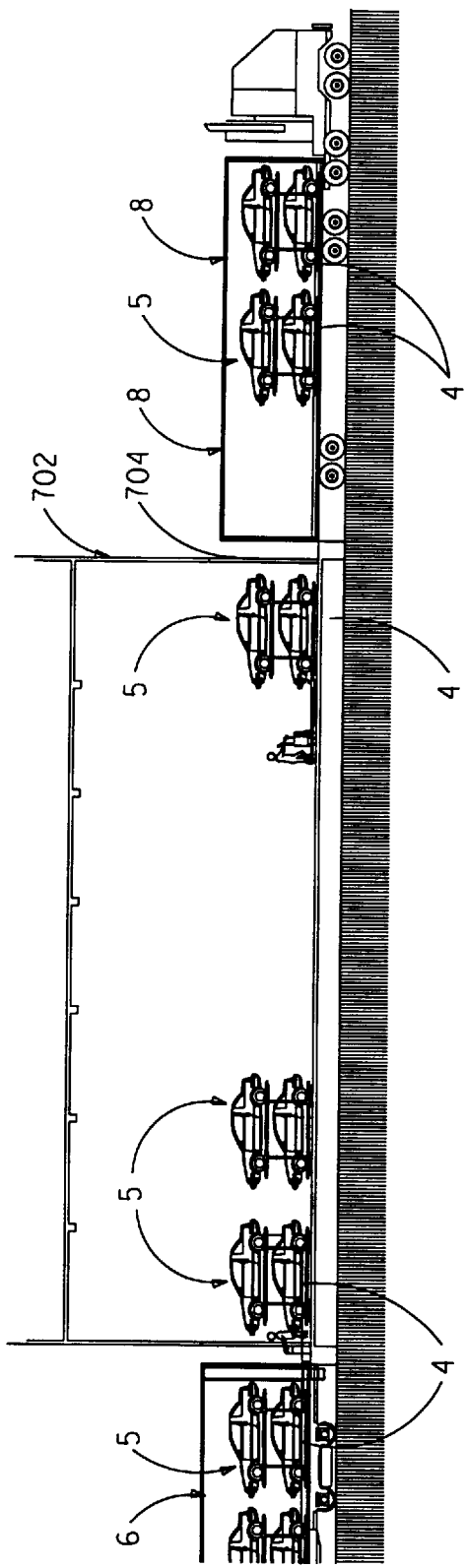
FIG. 8 is an end cross-sectional view of a loading an unloading facility, which is part of a distribution center.

At the Hub Distribution Centers HDC and Satellite Distribution Centers SDC, the rail cars 6 or containers 6', as the case may be, are unloaded, the units 4 allocated to their next destination, and loaded, preferably by automated conveyer systems 700 within a building 702 having multiple loading docks 704 served by the conveyor system (FIGS. 7 and 8). Some or all of the palleted car units 4 arriving at the distribution center may be temporarily stored in stacks 706 in an enclosed automated storage and retrieval rack system 708, such as an Eaton-Kenway "CarRise" manufactured by Eaton Automated Systems. All cars in transit are bar-coded with their vehicle identification numbers and tracked by computer. After all cars that make up full loads destined for Dealers or Satellite Distribution Centers have arrived at the Hub Distribution Center, they are retrieved and loaded onto outgoing rail cars 6, containers 6', or trailers 8 by the conveyor systems 700. The computer tracking and control system allows individual palleted car units 4 to be retrieved from storage and moved onto a waiting truck or a group of rail cars. An automated storage and retrieval system offers many advantages over large, open staging areas. Nonetheless, the palleted car units can also be unloaded from the rail cars, moved to a staging area, and later retrieved, moved back to the loading facility, and loaded for shipment to a satellite distribution center or to dealers.

Figure 9:
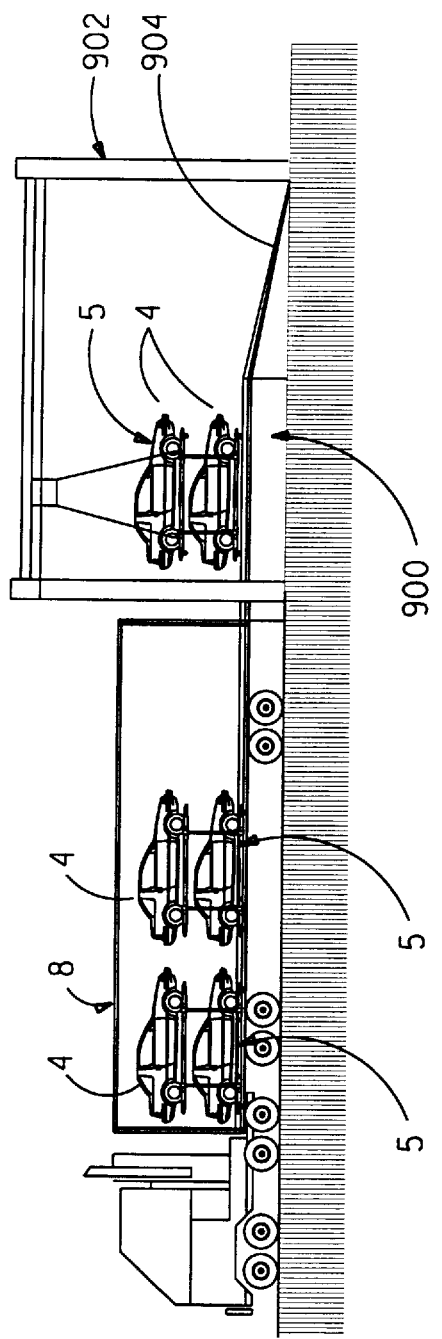
FIG. 9 is a side elevational view of a facility for unloading palleted car units from highway trailers at a dealer.

As illustrated in FIG. 9, palleted car units 4 arrive at Dealers in closed highway trailers 8 (or containers 6' transported by flat bed highway trailers, not shown). Each Dealer has an unloading platform 900 and an overhead traveling crane 902. The two-tier stacks of palleted car units 4 are removed from the truck one by one. The upper palleted car unit 4 is lifted by the crane from the supporting columns of the lower palleted car unit and lowered to the ground 904 adjacent of the platform. The car is driven off the pallet to the dealers storage lot and the pallet moved aside. The lower units are similarly lifted, moved and lowered to the ground. The empty pallets are lifted by the crane, formed into stacks and placed in the trailer or container, in which they are returned to the Distribution Center. Pallets returned to the Distribution Center are moved by rail or highway truck back to the factories in flows paths that are the reverse of the car delivery paths.

As described below, the columns of the lower pallets fold down, which permits the pallets to be stacked for return to the assembly plant. A trailer 8 or rail car 6 can transport large numbers of empty pallets in stacks, which leaves room in trailers for other cargo and makes many of the rail cars available for moving other freight. The pallet handling equipment on each rail car (described below) can be used to advantage with pallets designed for other cargo. A facility for receiving and loading other cargo into empty rail cars might, to considerable advantage, be located nearby each distribution center.

Figure 10:
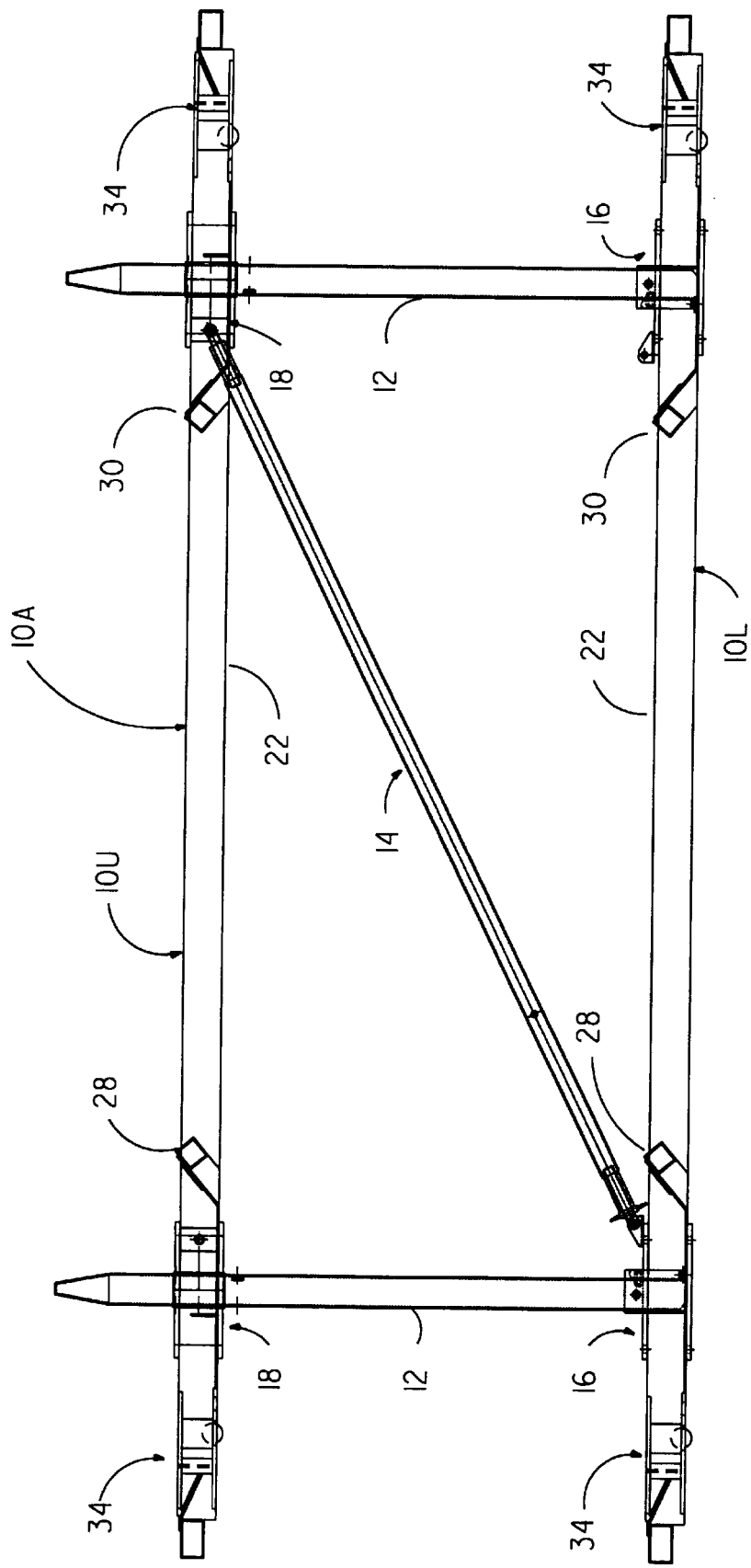

An embodiment of a pallet system for use in transporting cars in the manner described above is shown in FIGS. 10 to 29. Referring first to FIGS. 10 and 11, the system provides a pallet assembly 10A for forming two-tier units 5 of two palleted car units 5 each. Each assembly 10 comprises a lower pallet 10L and an upper pallet 10U, each of which is adapted to receive a car with its wheels supported thereon, and a pair of columns 12 affixed to each side of the lower pallet 10L. The upper pallet 10L is affixed to the columns 12 at a predetermined height above the lower pallet 10L in a position substantially parallel to the lower pallet. (In a modified form, the upper pallet is supported at an angle, as described below.) A length-adjustable brace 14 is connected diagonally between a side of the lower pallet between the columns and a side of the upper pallet between the columns. Braces 14 may be provided on both sides of the assembly, if desired.

The lower and upper pallets 10L and 10U are identical and are fitted with lower column brackets 16 and upper column brackets 18, respectively, for joining the pallets 10 to the columns 12. The pallets (FIGS. 10 and 11) have a peripheral frame constructed from tubular side members 20, 22 and end members 24, 26 and a pair of cross-members 28, 30. The space 32 within the frame and between the cross members is open. Pan-like wheel-support plates 34 are secured to the frame members at each corner. A tie-down bar 36 is fastened to each end frame member 24, 26.

Figure 14:
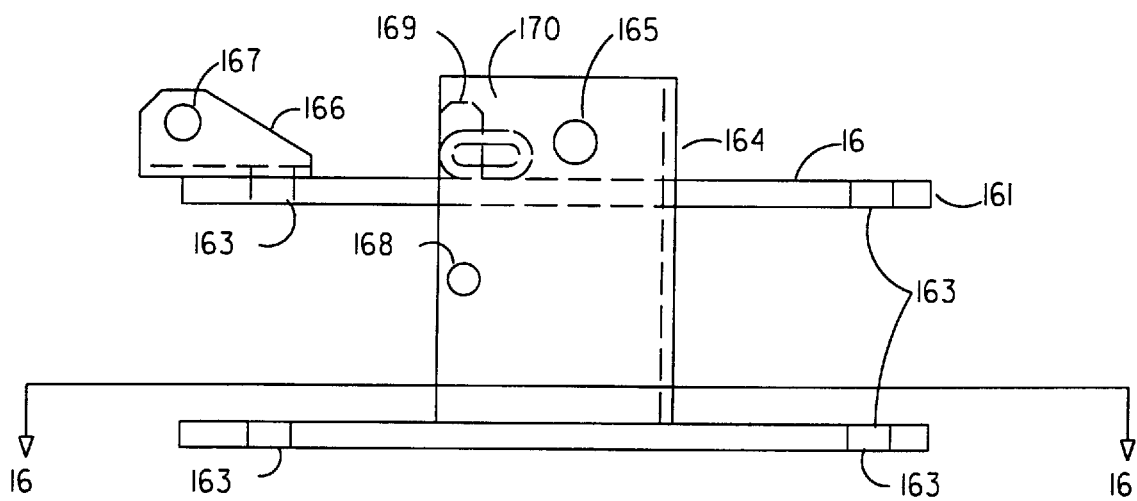
Figure 15:
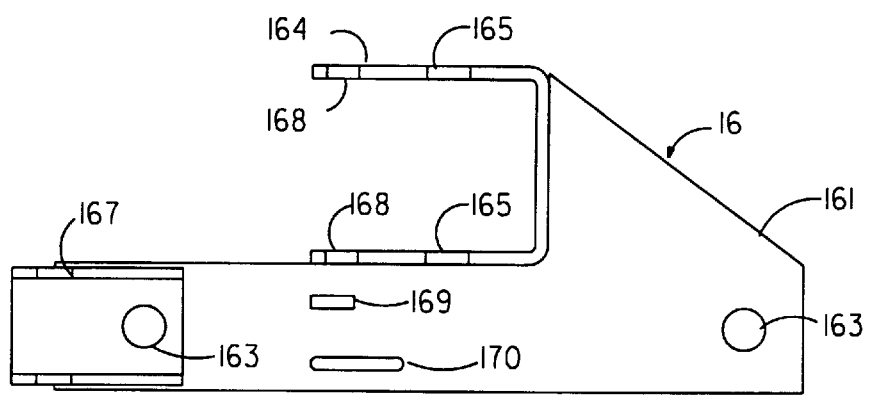
Figure 16:
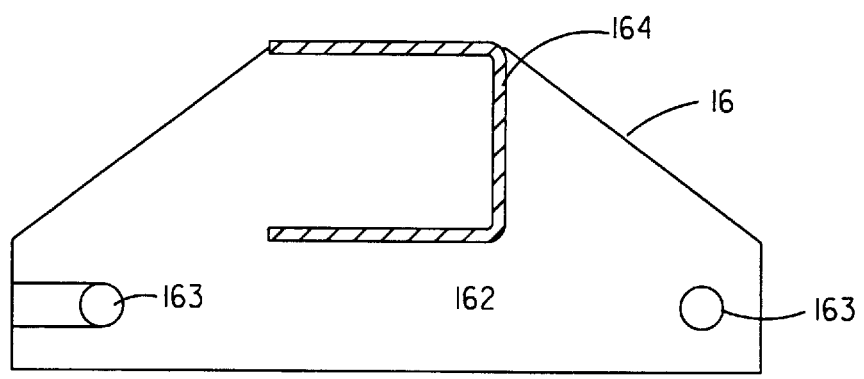

Each lower column bracket 16, as shown in FIGS. 14 to 16, comprises upper and lower plates 161, 162, each having two bolt holes 163, and a U-shaped column socket piece 164, which has aligned holes 165 extending transversely. The plates straddle the side members 20, 22 of the frame, and bolts passing through the holes 165 attach the column brackets to the pallet. A channel-shaped lug 166 is affixed to the upper plate 161 and has transversely aligned holes 167. Transversely aligned holes 168 receive a stop bolt for the column, as described below. A pin keeper plate 169 and a lifting ring 170 extend up from the upper plate laterally of the holes 165.

Figure 18:
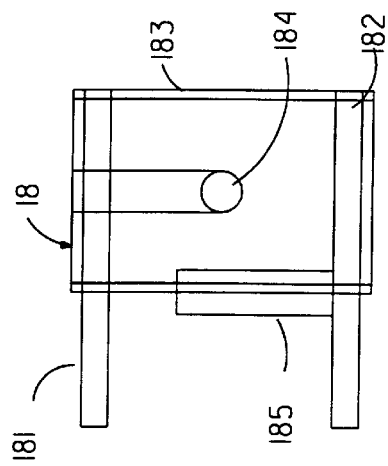
Figure 17:
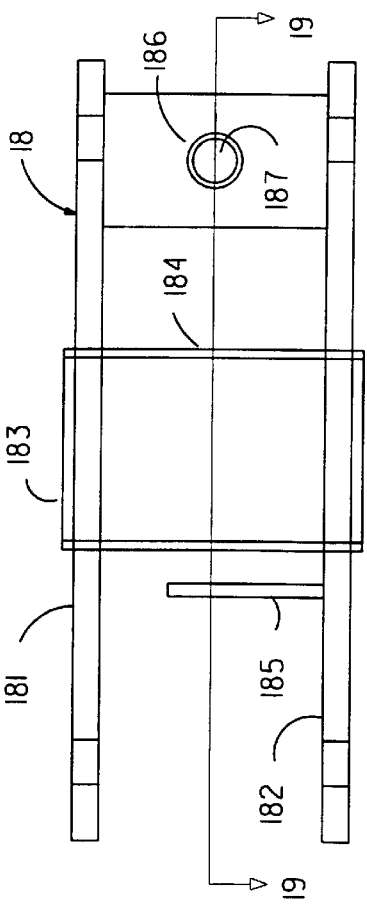
Figure 19:
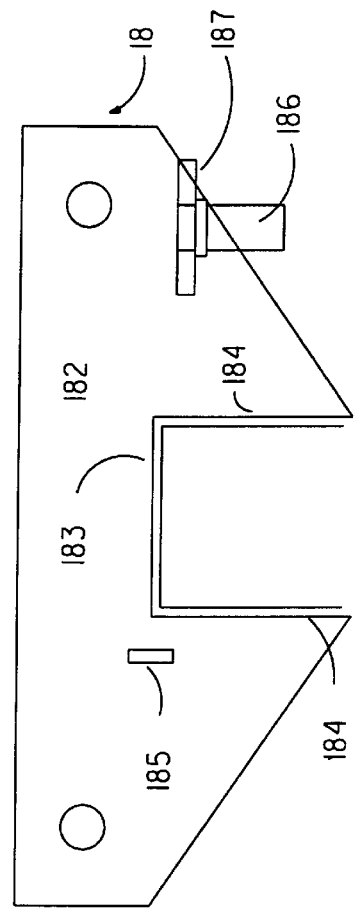
Figure 20:
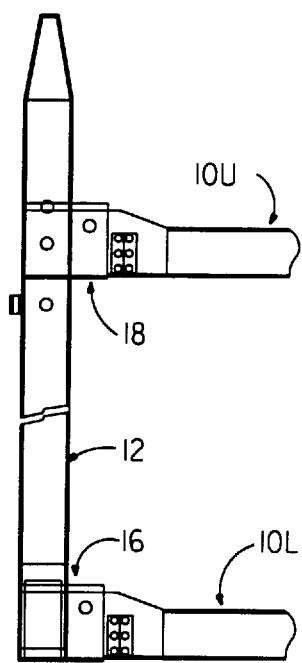
Figure 21:
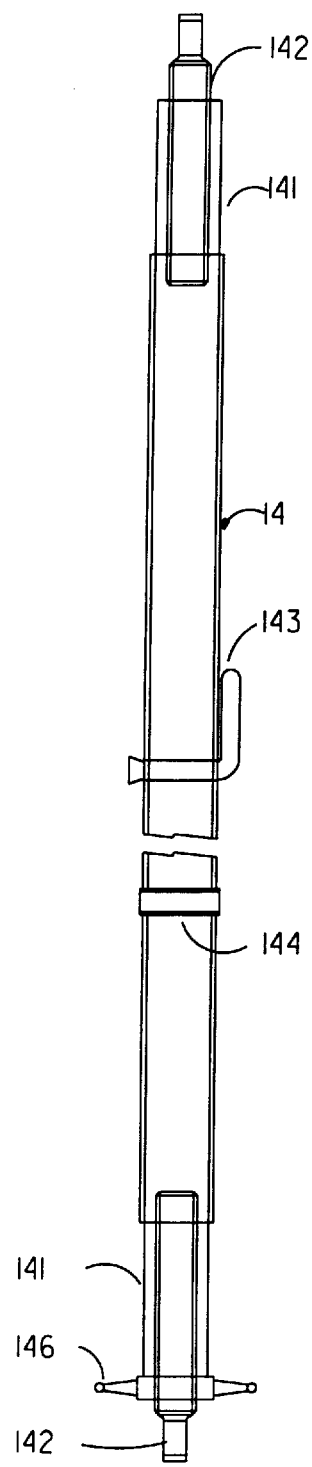
Figure 22:
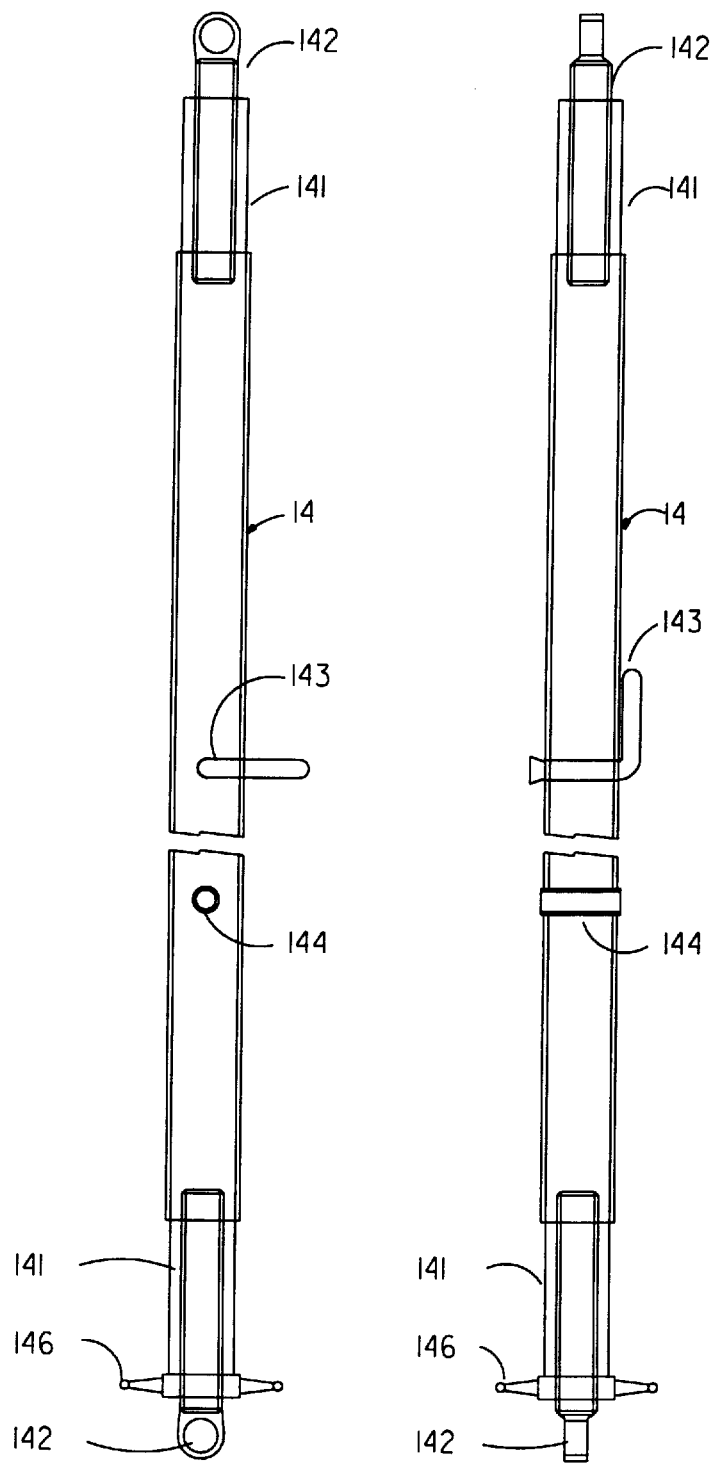

Each upper column bracket 18, as shown in FIGS. 17 to 19, has upper and lower plates 181 and 182, each having hole pairs for bolting the column bracket to a pallet 10, and a closed tubular socket piece 183 affixed to the plates. Aligned holes 184 extend in the lengthwise direction, relative to the pallet, through the socket piece and receive a coupling pin (not shown) by which the column bracket 18 is affixed to a column, as described below. A pin keeper plate 185 extends up from the lower plate to capture an arm on the pin. A capture pin 186 (hidden and not shown in FIG. 18) for the diagonal brace 14 projects from a plate 187 fastened between the upper and lower plates 181 and 182.

As indicated above, the upper and lower column brackets are attached to the pallets by bolts. As may be seen in FIG. 10, the side members 20, 22 of the pallet frames have several bolt holes for each column bracket, which permits the column brackets to be fastened to the pallets in different lengthwise positions. The ability to adjust the positions of the column brackets on the pallets allows the assembly 10A of two pallets to be configured differently for different vehicles.

Figure 23:
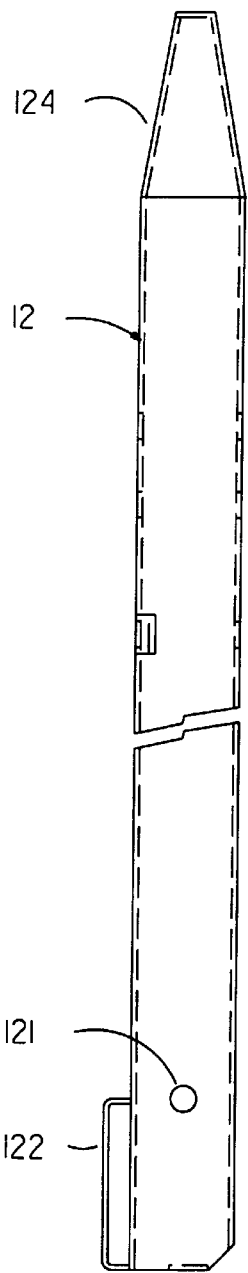
Figure 24:
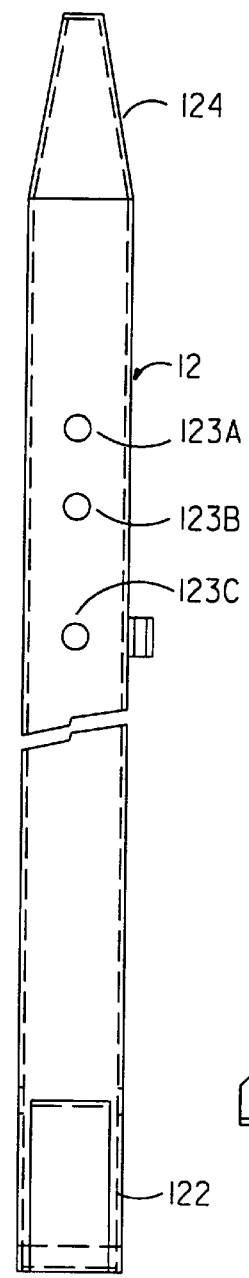
Figure 25:
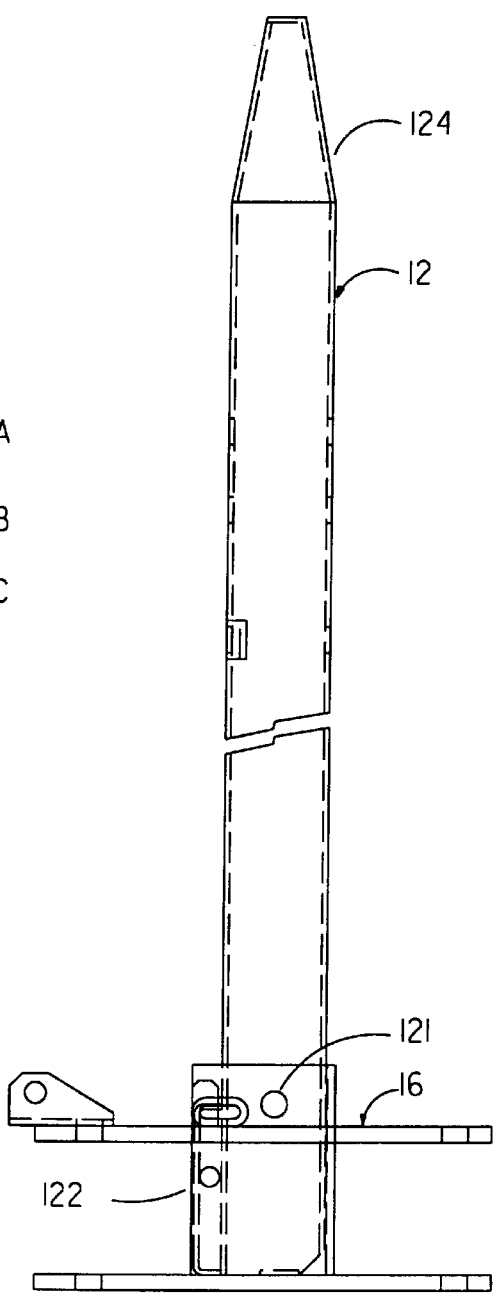

Referring to FIGS. 23 to 25, the columns 12 are tubular and of square cross-section. The external dimensions are such that the lower end of the column is received with a close sliding fit in the socket piece 164 of the lower column bracket 16 and the upper part receives with a close sliding fit the socket piece 183 of the upper column bracket. A hole 121 near the lower end of the column receives a pin, which also passes through the holes 165 in the socket piece 164 of the lower column bracket. The pin pivotally attaches the column to the socket piece such the column can be collapsed by folding it down through the open side of the socket piece. A channel-shaped plate 122 affixed to the column receives a bolt or pin through the holes 168 in the lower column bracket, which supports the column in the erected, vertical position.

Near the upper end of the column are three pairs of aligned holes 123a, 123b and 123c. Each hole pair provides for attaching the upper pallet 10U to the columns by pins that pass through the holes 184 in the socket pieces 183 of the upper column brackets 18 at a different height above the lower pallet 10L. The selected height depends on the height of the vehicles being transported. It will be noticed that the upper end portion 124 of the column is tapered, which facilitates lowering an upper pallet onto the columns when the stack of two pallets is assembled for a shipment.

The upper pallet 10U can be attached to the columns by attaching a collar to each column 12 at the desired height using one of the holes 123 and a collar of the desired height relative to the hole location. The socket piece 183 of each upper column bracket 18 bears against the collar and supports the upper pallet on the column. It is also possible to provide of permanent collar or other support for the bracket 18 on the column 12 at the desired height.

The diagonal brace 14 (FIGS. 21 and 22) is length-adjustable, first to enable it to be adjusted to match the height of the upper pallet 10U and, second to enable it to be extended to tighten and impart rigidity to the assembly 10A of two pallets. It is tubular and has threaded fittings 141 affixed to it at both ends, each of which receives an eye bolt 142. The threads of the fittings and eye bolts at either end are of opposite hand so that when the brace body is rotated about its lengthwise axis in one direction, both eye bolts thread out and when rotated in the other direction, both eye bolts thread in. The brace is, in that respect, like a turnbuckle. A short handle 143 is received by the brace tube to facilitate rotating it relative to the eye bolts. In the assembled stack, one eye bolt is fastened to the anchor 167 on the lower column bracket 16 by a bolt passing through the holes 167, and the other eye bolt is received by the pin 186 on the upper column bracket 18 (see FIG. 1). To enable more torque to be applied to the brace 14 than can be applied by the handle 143, a bar can be inserted into a tube 144. A handled lock nut 146 locks the brace against loosening.

As discussed above, the pallets are constructed so that they can be disassembled from the assembly and shipped from a destination to which cars were delivered back to a place of origin in a small volume. The columns 12 and brace 14 fold down against the bottom pallet, and each upper pallet can lie flat on top of a lower pallet. In other words, many pallets and their associated columns and braces can be stacked in a single container, leaving the containers from which some of them came empty for transporting goods on the return trip.

The pallets are loaded at the plant MP either by driving the cars onto them as they come off the assembly line or by depositing them by automated conveyors. The cars, of course, are supported by the pallets with their wheels nesting in the pans 34. Blocking bars (not shown) are fastened to the pallets to block the wheels. Tie downs are fastened between the cars and the tie down bars 36 at the ends of the pallets. The tie downs for the cars on the lower pallets may be highly tightened to lower the cars on their suspensions and thereby reduce the height at which the upper pallet must be located above the lower pallet of a stack. The opening 32 in the upper pallet allows an uppermost part of the body of a car on the lower pallet to protrude through it to above the plane of the upper pallet, which allows cars with higher profiles to be loaded on the stack of two pallets, and accommodated in a standard shipping container or highway trailers.

Before or after the cars are loaded onto the pallets and secured, the columns are erected to stand upright and locked in place. The upper pallet with the car on it is lifted up by a crane or a fork lift and lowered onto the columns to the desired position. The two-level palleted car units 12 can also be assembled automatically by conveyor equipment at the plant in which cars on pallets are moved at two levels into positions one over the other and the upper pallets are lowered onto the columns of pallets of the lower unit.

The diagonal brace 14 is raised and manually adjusted to allow its upper eye bolt to be received on the pin 186 of the upper column bracket and suitably secured in place on the pin, such as by a lock pin or ring (not shown) received by the pin 186 outboard of the eye bolt. The brace is then tightened to take up the looseness in the couplings between the columns and the socket pieces of the column brackets. If desired, diagonal braces can be used on both sides of the assembly 10A.

The lower pallets 10L, optionally, may be fitted, removable side bumpers (not shown), which are fastened by pins or bolts to the side members of the pallets 10 near each corner. The bumpers 30 engage the sides of a highway trailer or a container to guide the stack of two palleted car units when it is loaded into the container and hold it in position laterally. End bumpers or spacers (not shown) can be fitted as required to the ends of the lower pallets 10L to maintain the desired lengthwise spaces between the two-tier units 5 of palleted car units 4 in a trailer 8 or container 6' and between the endmost units 5 and the ends of the trailer or container.

Figure 26:
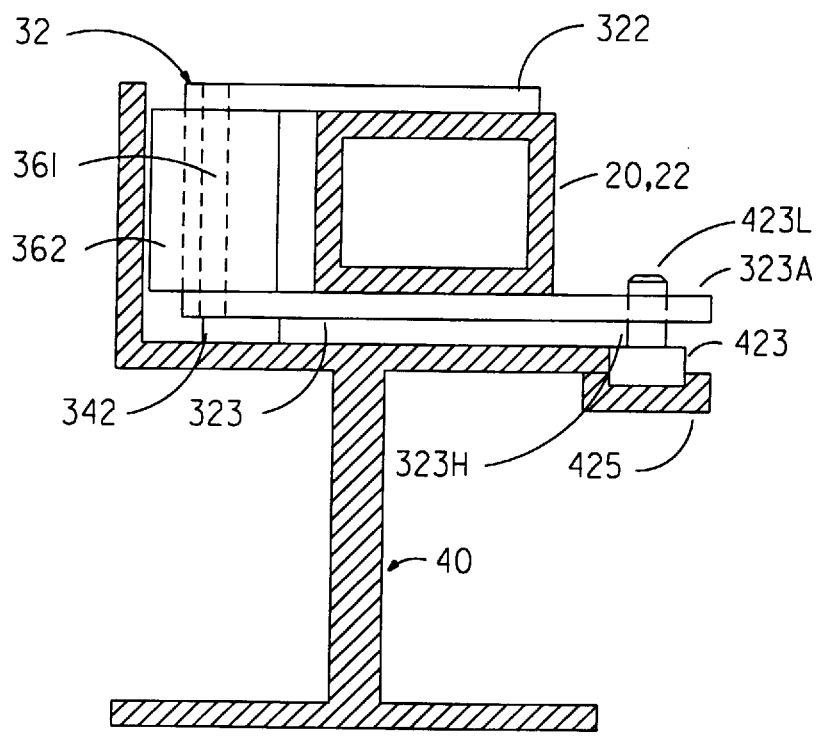

Each pallet 10L, 10U has four roller/guide assemblies 32 (FIGS. 26 to 29 and see also FIGS. 10 and 11), one at each corner. A U-shaped wheel support 321 that is welded between upper and lower mounting plates 322 and 323 receives a roller axle 341 and roller 342. An axle 361 fastened to the mounting plates receives a guide roller 362. The mounting plates straddle and are bolted to the side members 20 or 22 of the lower pallets 10L (FIG. 26). The rollers 342 permit the stacked units 5 of palleted car units 4 to be rolled along tracks or roadways when the units are moved into and out of rail cars, highway trailers and containers and moved from place to place. The stacked units 5 are rolled into trucks and containers, using equipment such as hand-controlled trucks for pushing the units into and pulling them out of the highway trailers and containers and traction conveyers built into the rail cars, as described below.

It is impractical to load and unload rail cars one by one, because uncoupling rail cars and moving them one by one is unduly time-consuming and costly. The present invention includes a relatively simple and inexpensive loading system for loading and unloading stacks 5 of two palleted car units 4 onto and off of a group of several (e.g., five) rail cars while the rail cars of the group remain coupled. The system includes, as shown in FIGS. 26 and 30 to 32, elevated tracks 40 in the form of beams installed on the floor of each rail car for supporting and guiding the stacks 5 of palleted car units 4 along the cars and a roller chain conveyor 42 associated with each track 40 for pulling the stacks 5 one after the other in a train along the tracks 40. The conveyor 42 also pulls each stack into the rail car in which the conveyor is installed from another rail car or from a loading dock and pushes each stack 5 into another rail car or onto a receiving loading dock.

Each chain conveyor 42 comprises a drive sprocket 421 that is affixed to a shaft 422, which is rotatably mounted in bearings (not shown) on the two tracks 40. One end of the shaft 422 extends laterally outwardly to the side of the rail car housing 6h (FIGS. 30 and 31) and has a suitable coupling at its end that enables it to be attached to a portable drive motor/transmission 43 provided at the loading/unloading station. An endless roller chain 423 is trained around the drive sprocket 421 and an idler sprocket 424 at the other end of each track 40.

Figure 27:
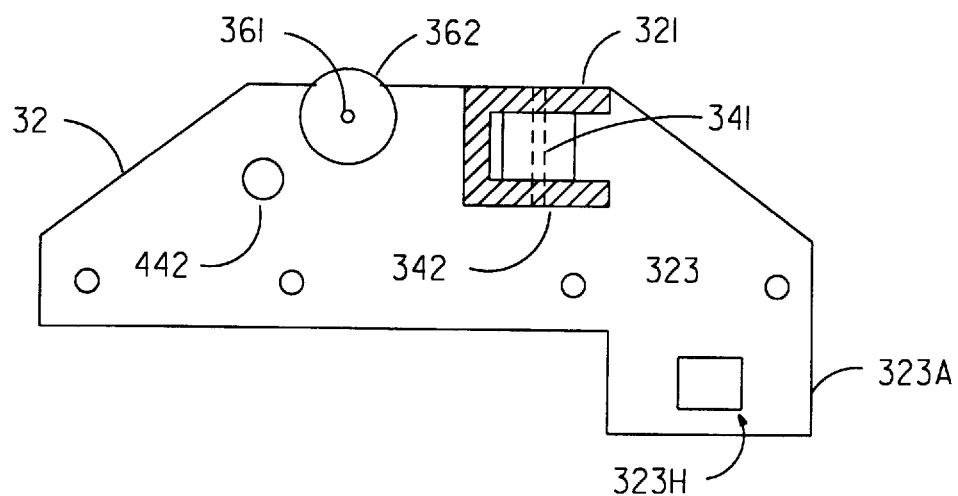
Figure 28:
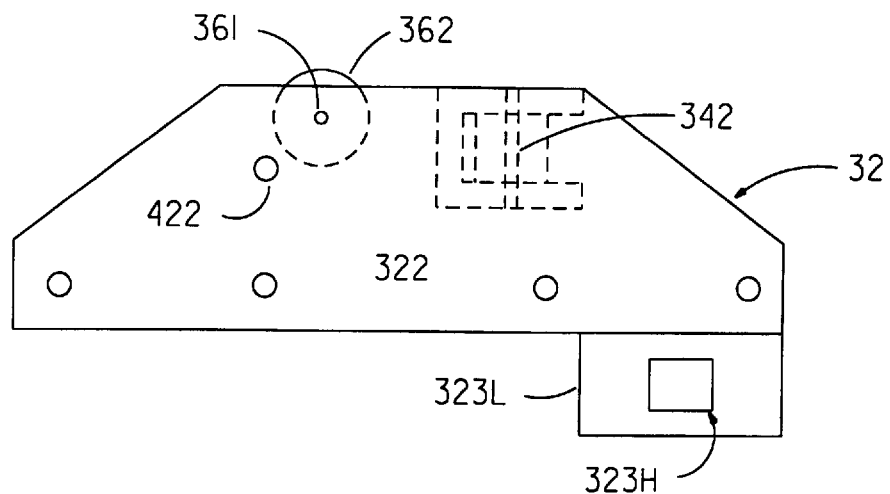
Figure 29:
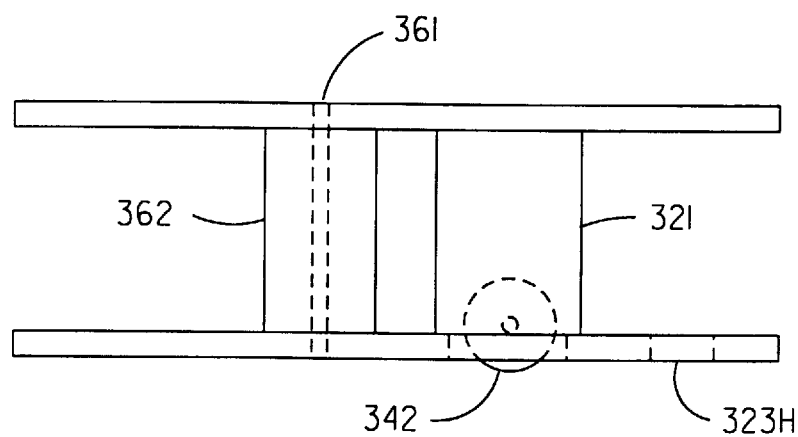
Figure 30:
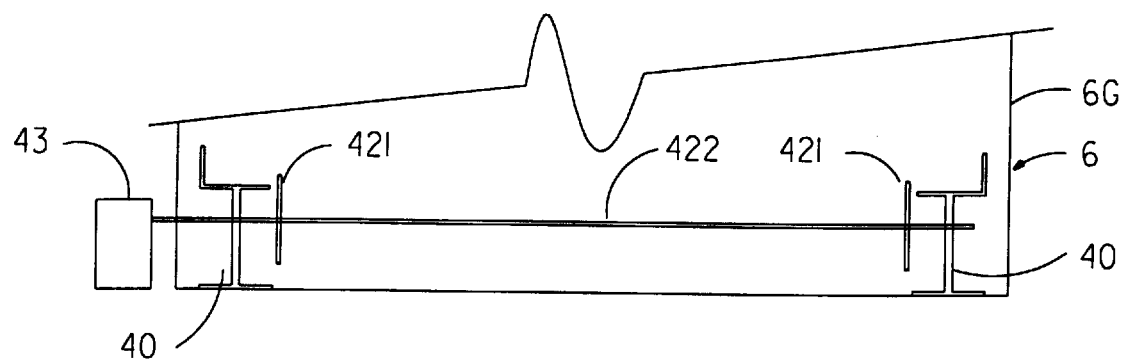
FIG. 30 is a schematic partial end view of a rail car body having tracks for the guide/roller assemblies and chain drives for moving palleted car units along the tracks.
Figure 31:
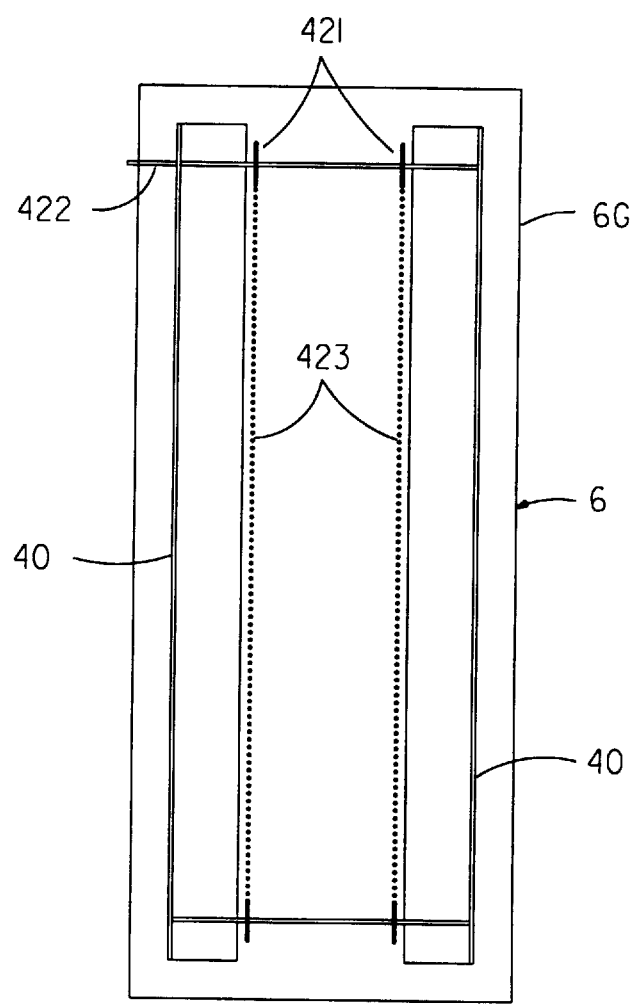
FIG. 31 is a schematic top plan view of the tracks and chain drives of FIG. 30.
Figure 32:
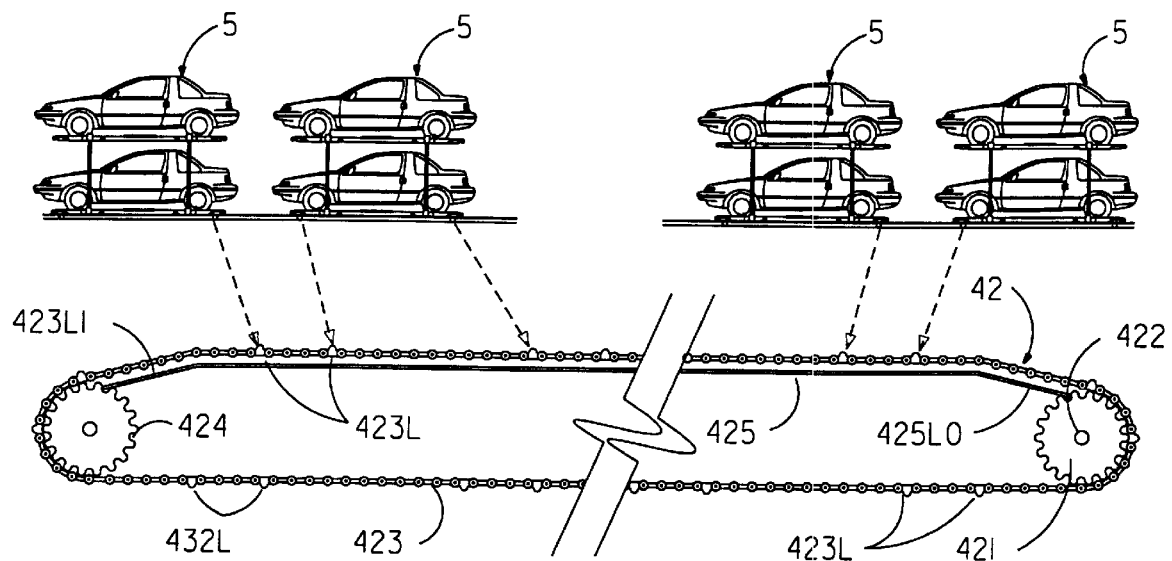
FIG. 32 is a schematic side elevational view of a chain drive of a rail car and shows how the pallets are coupled to the chain drives.

The upper run of the chain 423 is guided along a chain guide 425 that is affixed to the track 40 and has sloping lead in and lead out sections 425LI and 425LO at its ends (FIG. 32). Some of the links of the chain 423 have lugs 423L that, along the upper run of the chain, project upwardly and are spaced apart such as to be received in holes 323H in arm portions 323A of the lower plates 323 of the roller/guide assemblies 32 (FIG. 27). The lugs of each chain are paired so that each palleted car unit stack 5 is engaged by a pair of lugs (one near the front and one near the back of the lower pallets of the stacks) of each of the chains (making a total of four lugs engaging the holes 323H of the corresponding four roller/guide assemblies 32 of each lower palleted car unit). That arrangement enables the chain conveyor 42 of each rail car to pick up the front end of a pallet stack 5 that is pushed partway into the rail car by engaging lugs 423L with the holes 323H of the roller/guide assemblies 32 at the front of the incoming pallet stack. The sloping lead-in portion 425LI of the conveyor automatically brings the lugs 425L into engagement with the holes. Similarly, the arrangement of the chain conveyors 42 of each rail car provides for pushing each stack 5 of two palleted car units 4 partway out of the rail car by engaging lugs 423L with the holes 323H of the roller/guide assemblies 32 at the rear of the outgoing stack. The lug pairs are, of course, spaced apart to maintain the stacked palleted car units end to end in close proximity. As each stack leaves one rail car and enters another, the sloping front lead-out segment 425LO enables the chain lugs 423L to disengage from the holes 323H of the roller/guide assemblies 32 seriatim.

Removable track bridge members (not shown) are placed between the ends of the tracks 40 of adjacent coupled rail cars when they are loaded and unloaded to provide an uninterrupted trackway along a group of several rail cars. Each stack 5 of two palleted car units 4 is pushed partway into the end rail car from the loading platform, and the chain conveyor is operated to pull it into the end rail car. Each successive stack is likewise introduced into the end rail car. Each time the conveyor is operated to bring another stack 5 into the end rail car, all stacks 5 previously loaded are advanced one step. The drive/transmissions for the conveyors of all of the rail cars can be controlled from a single station to operate in coordination. Ultimately, the entire group of coupled rail cars is completely loaded, at which point all of the lower palleted car units 4 of all of the stacks 5 are anchored individually in place by suitable means, such as by retainer bars (not shown) inserted through holes 442 (FIG. 27) in each of the roller/guide assemblies 32 of each lower palleted car unit 4 and matching holes (not shown) provided in the tracks 40. The drive/transmissions 43 for the conveyors can then be disconnected, and the loaded group of rail cars is ready to be taken away.

The unloading process is the reverse of the loading process, except that the stacks 5 of palleted car units are pushed out one by one from the end opposite the end that received cars. Any selected group of rail cars can be loaded at one point and another group unloaded at another - the loading/unloading process with the equipment described above can be carried out with random groups of rail cars.

It is also possible to provide the idler sprockets 424 with a drive shaft with a coupling so that they can be coupled to a transmission unit 43, thus permitting the stacks to be loaded or unloaded from either end of each rail car.

The tracks and drive units are readily produced as assemblies, which can easily be installed in existing rail cars to retrofit them for use in transporting palleted car units 4. The track and drive units are also suitable for loading and unloading other cargo into and from groups of rail cars using pallets of similar configurations to those of the pallets 10 but with floors or racks to support general cargo loads.

Figure 33:
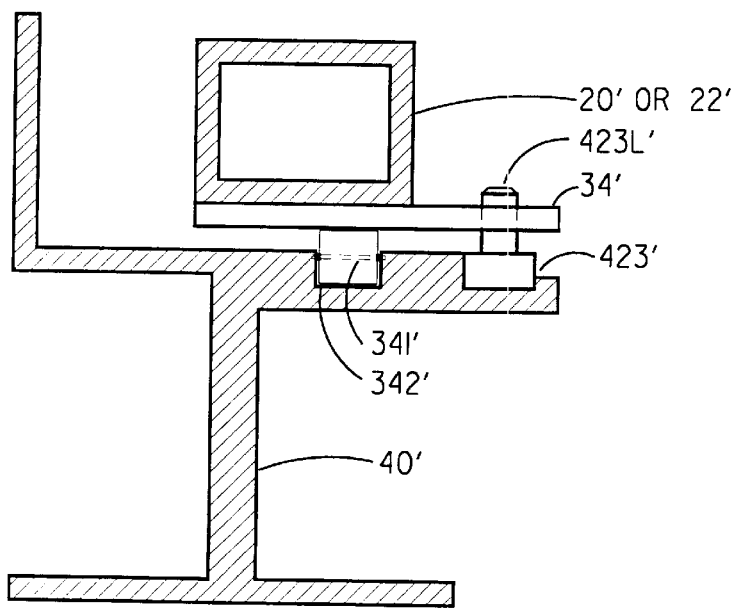
FIG. 33 is a partial end view of a track fitted with a roller bed along which pallets can be rolled onto and off of rail cars.

FIG. 33 shows a modification of a track 40' for a rail car that is set up to handle pallet stacks in which the pallets are not fitted with roller/guide units. Instead the tracks are equipped with spaced-apart rollers 342' supported on shafts 341' along which the pallets roll. In such an arrangement, the side members 20', 22' of the pallets are made so that there are no projecting portions or elements and a flat rolling surface is presented to the rollers 342'. A drag arm 34' with a hole is fastened to the side member of each lower pallet to accept the lugs 423L' of a traction chain 425'.

Figure 34:
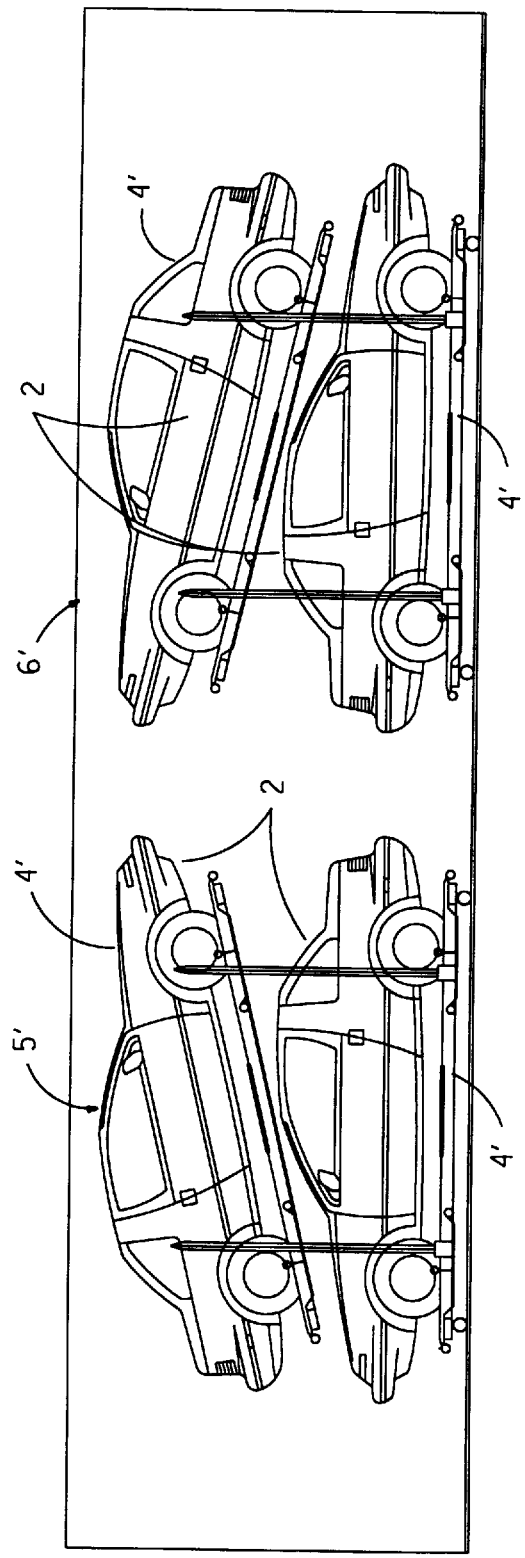
FIG. 34 is a schematic side elevational view showing two-tier stacks of palleted car units, the upper pallets of which have been modified to permit tall cars to be carried in a standard container.
Figure 35:
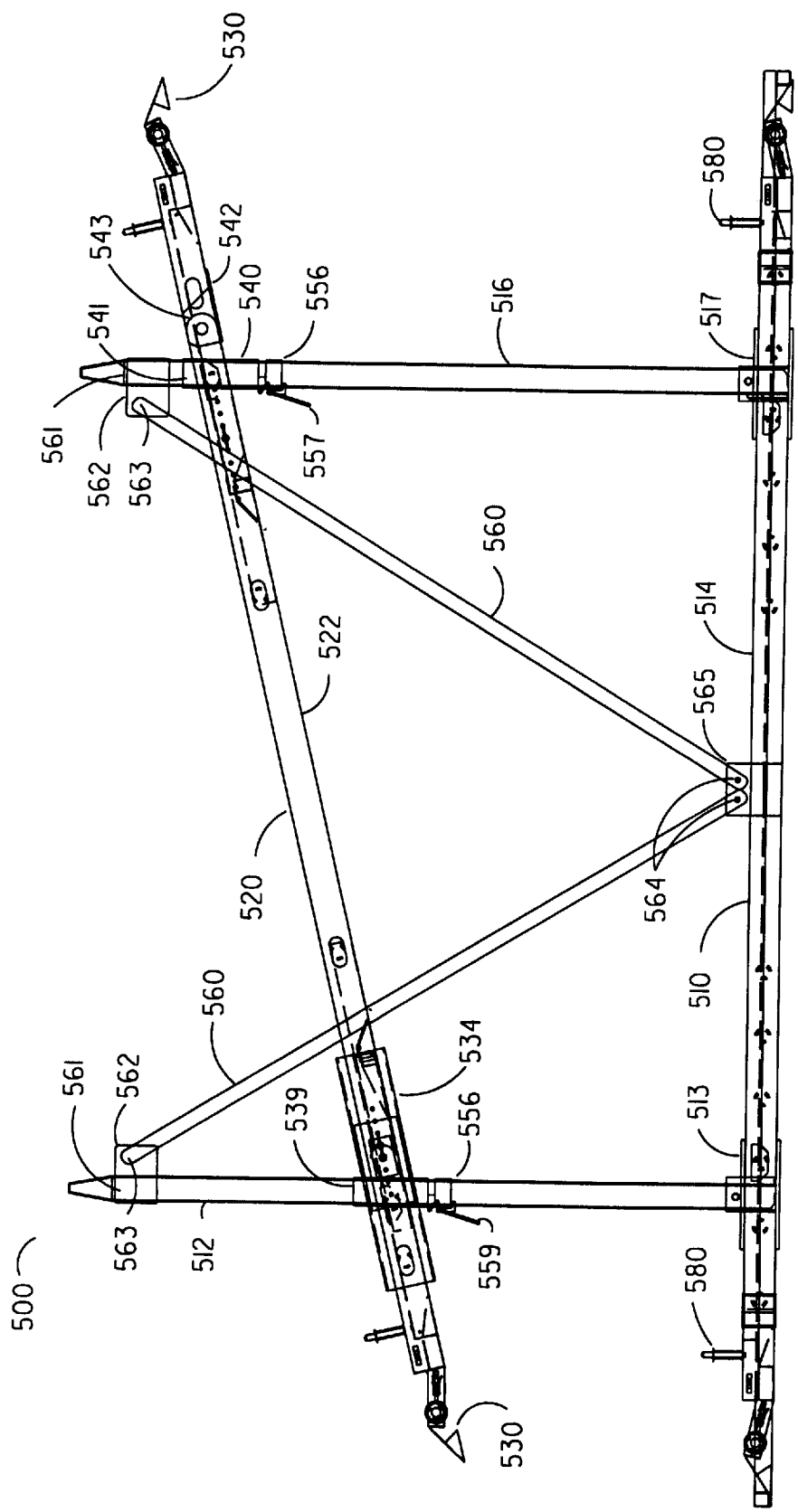
FIG. 35 is a side elevational view of another embodiment of a car transport rack embodying the present invention and following the concept of the rack of FIG. 34.

FIG. 34 illustrates stacks 5' of palleted car units 4' received within a standard shipping container 6'. In order to accommodate relatively large cars 2 on stacked pallets within the container, the upper palleted car unit of each stack is tilted to reduce the overall height of the stack. That is accomplished by providing modified column brackets on the upper pallets, the upper column brackets having the sockets that receive the columns of the lower palleted car unit oriented at an angle to the upper and lower plates, and attaching the upper column brackets to the upper pallet at a greater distance apart lengthwise. The details of the arrangement are not shown in FIG. 34, inasmuch as the modifications are easily understood from the foregoing description and the drawing figure.

Another embodiment of a car transport rack, which is conceptually similar to that shown FIG. 34 and is shown in FIGS. 35 to 44, allows for adjustment of the height and slope of the upper pallet to adapt it for different car models, permits the overall height of a loaded rack to be minimized, and facilitates loading and unloading of the racks with simple equipment. The rack 500 of FIGS. 35 to 44 has a lower pallet 510, a pair of front columns 512 that are supported by front brackets 513 connected to respective side frame members 514 near a front transverse frame member (not visible), and a pair of rear columns 516 that are supported by rear brackets 517 connected to the respective side frame members 514 near a rear end frame member (not visible). The brackets support the columns in a manner that enables them to pivot down to lie one above the other beside the side frame member. The arrangement of the columns and brackets is the same as that of the embodiment of FIGS. 10 to 29. The lower pallet 510 is essentially the same as the upper pallet 520, which is shown in FIGS. 36 and 37. In that regard the lower pallet has a wheel pan (not visible) in each corner of the peripheral frame.

The upper pallet 520 has side frame members 522, a front end frame member 524, a rear end frame member 526, and a wheel pan 528 received within the frame in each corner. A ramp piece 530 is affixed to each end frame member adjacent each wheel pan. A pan side support beam 532 carries several fittings that are used with various tie-down devices that can be used, depending on the car model, such as chains, cables or wheel harnesses. Such fittings are known per se and need not be described.

Figure 38:
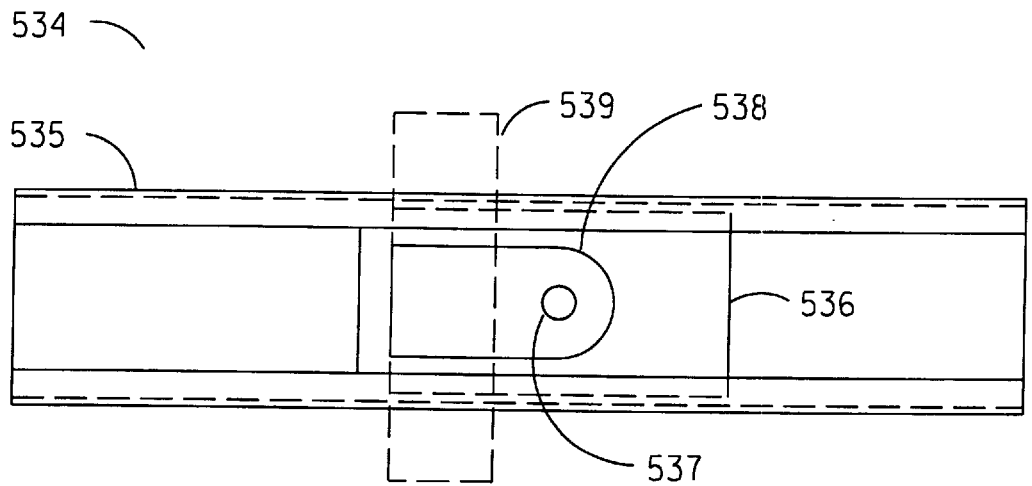
FIG. 38 is a schematic side elevational detail view of the bracket for supporting the front end portion of the upper pallet on the column.
Figure 39:
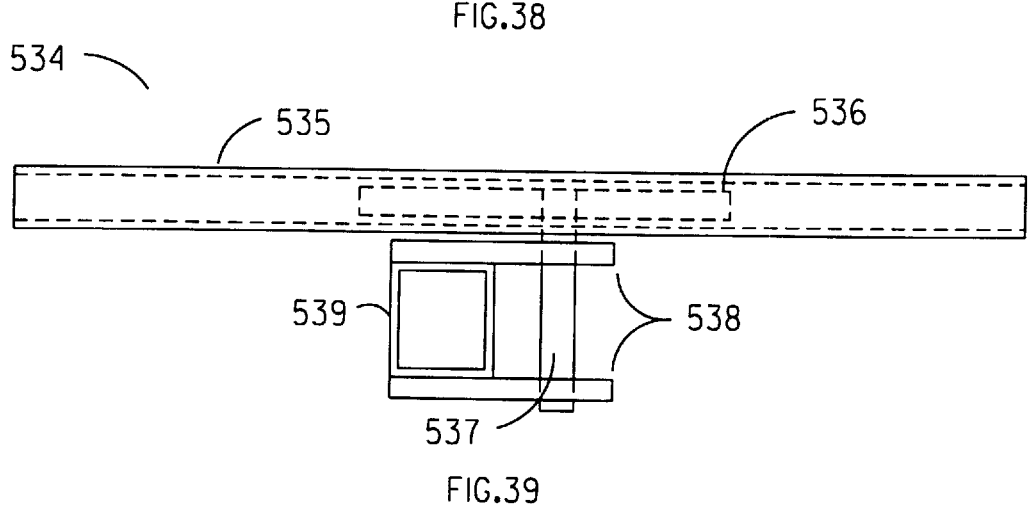
FIG. 39 is a schematic top plan view of the bracket of FIG. 38.
Figure 40:
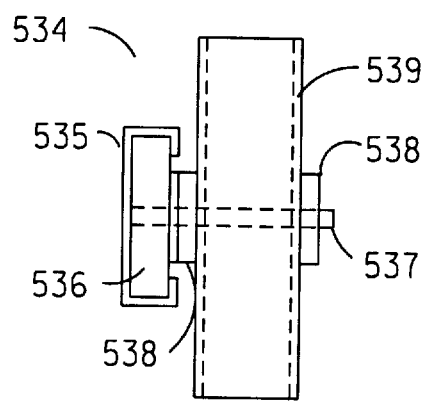
FIG. 40 is a schematic end view of the bracket of FIGS. 38 and 39.
Figure 42:
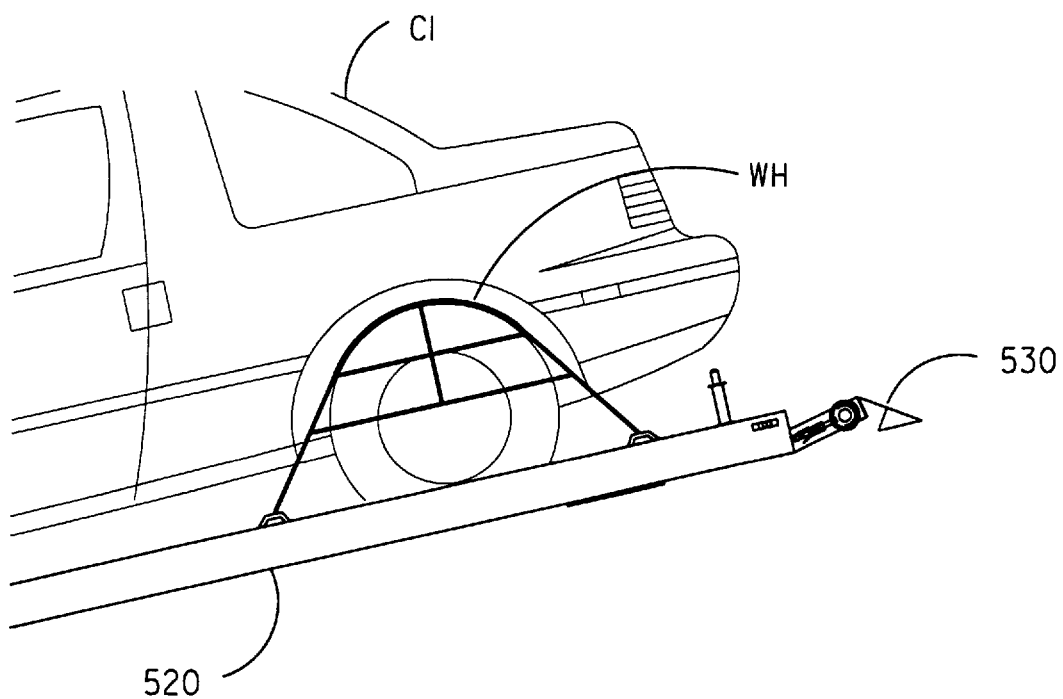
FIG. 42 is a partial side elevational view of an upper pallet on which a car is secured by a wheel harness.

The upper pallet 520 is supported on the front columns 512 by front upper pallet support brackets 534, which permit the front end of the upper pallet to be moved to a selected vertical position above the lower pallet, permit the slope of the upper pallet to vary to meet the needs of different car models, and accommodate the variation in slope by sliding of the side frame members 522 relative to the front columns 512. As shown in FIGS. 38 to 40, each bracket 534 has a channel 535, which is welded or otherwise suitably attached to the side frame member 522 of the upper pallet and receives a slide block 536. A pivot pin 537 affixed to the slide block 536 is pivotally received in aligned holes in plates 538 that are affixed to a tubular bracket body 539. The body is received for vertical sliding movement by the front column 512.

Rear upper pallet support brackets 540 support the rear end portion of the upper pallet 520 on the rear columns 516 for adjustment of the height of the rear end of the upper pallet and for pivotal movement to accommodate variation of the slope of the upper pallet. Each of the rear brackets 540 has a tubular body 541 that is received telescopically on the column 516 and lugs 542 that are welded to the side walls of the body 541 and have holes that receive a pivot pin 543. The pivot pin is received in a hole in the side frame member 520.

The vertical positions of the upper pallet support brackets 534 and 540 on the columns 512 and 516 are established and maintained by support collars 556, which are received telescopically on the columns and fixed at the desired vertical height on the column by pins 557 that pass through aligned holes (not visible) in the front and back walls of the collar and a selected pair of aligned holes in the front and back walls of the column. Each column has a series of vertically spaced-apart holes for positioning the support collar at the desired height. The tubular bodies 539 and 541 of the upper pallet brackets 534 and 540 rest on the upper ends of the support collars 556.

Each column 512, 516 is supported against tilting under moderate loads by the bracket 513, 517 when erected but is also stabilized against tilting from the vertical under high loads by a diagonal brace 560. The upper end of each brace is connected to the column by a sleeve 561 that is received over the column and has a projecting arm 562 to which the brace is coupled by a pin 563. The sleeve 561 is held in position on the column by a removable pin (not shown). The lower end of each brace 560 is connected by a removable pin 564 to a gusset 565 that is affixed to the side frame member 514 of the lower pallet. The braces are easily removed when the rack is disassembled by taking out the pins 562 and 564.

One way of loading the rack 500, as shown in FIGS. 41A, 41B, and 41C, is to assemble the rack by erecting the columns 512 and 516, lowering the upper pallet 520 from above onto the columns using a fork lift or an overhead hoist and cables, with or without a lifting frame, and installing the braces 560. The rear end of the upper pallet is set to a selected height above the lower pallet by installing the collars 556 at the desired position on the rear columns 516, which can usually be the transport height suited for the particular car model at which the upper pallet will be located when loaded with cars and transported. The front end of the upper pallet is lowered so that it rests on or is located very close to the lower pallet (FIG. 41 A). Removable wheelway plates 570 (phantom lines in FIG. 36), which bridge the gaps between the wheel pans 528, are installed on the upper pallet. A first car CI is driven onto the upper pallet and secured in place by a suitable anchoring arrangement, such as chains, cables or the wheel harness WH shown in FIG. 42. Using the lifting hoist or a fork lift truck FLT (FIG. 41B), the front end of the upper pallet is lifted up to a height above the height at which it will be when the loaded rack is transported and the front support collars 556 are manually pushed up on the columns and pinned in place at the desired transport position. The front end of the upper pallet is then lowered so that the tubular bodies 539 and 541 of the support brackets rest on the front support collars 556. When the front portion of the upper pallet is lifted and then lowered, the upper pallet pivots about the pivot pin 542 of the front support bracket 540 and both pivots and slides relative to the front support bracket 534.

The wheelway plates 570 are removed from the upper pallet, thus leaving an opening in the upper pallet between the side frame members 522 and the wheel pans 528 into which an upper portion of a second car CII received on the lower pallet can protrude. The wheelway plates 570 can be installed on the lower pallet 510, if the lower pallet does not have wheelway plates of its own. The second car CII is then driven onto the lower pallet and secured in place (FIG. 38C). As mentioned above, it may be necessary to hold the front end of the upper pallet temporarily at a position higher than the transport position to leave a clearance for the car CII to be driven onto the lower pallet and tied down and then lower the upper pallet to the transport position.

Before the second car CII is driven onto the lower pallet, the height of the rear end of the upper pallet can be adjusted, if necessary. Generally, it is desirable to assemble the rack with the rear end of the upper pallet initially in the transport position, inasmuch as lifting the rear end without also lifting the front end of the upper pallet requires the upper pallet to slide relative to the front support bracket 534. If the front support brackets are carrying part of the weight of the car, they will be subject to a high friction load. When the front end of the pallet is lifted, the front support brackets 534 are not carrying the weight of the car and there is little friction and thus little resistance to sliding of the upper pallet relative to the front support bracket. For that reason, it is highly preferable to locate the rear end of the upper pallet at the transport height before driving a car onto the upper pallet and lift the front end of the upper pallet to the transport height after the car is driven onto it from the front end and secured in place.

Figure 43:
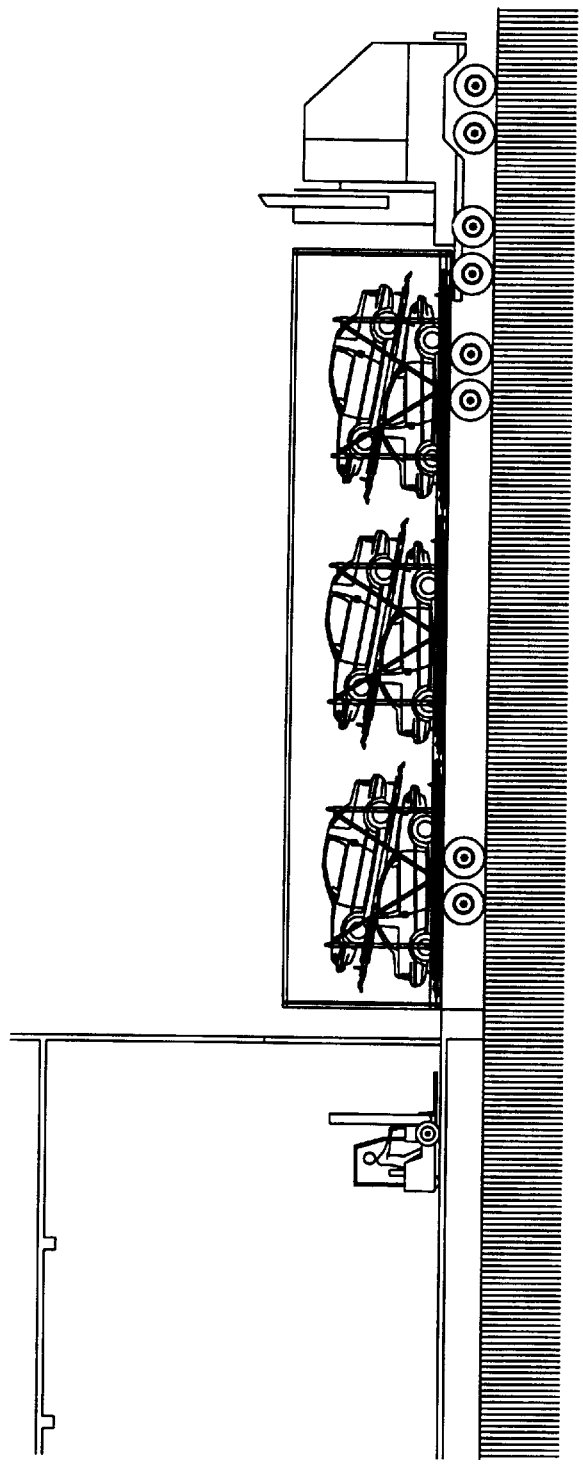
FIG. 43 is a diagrammatic side view of a highway trailer loaded with the car transport racks of FIGS. 35 to 40.
Figure 44:
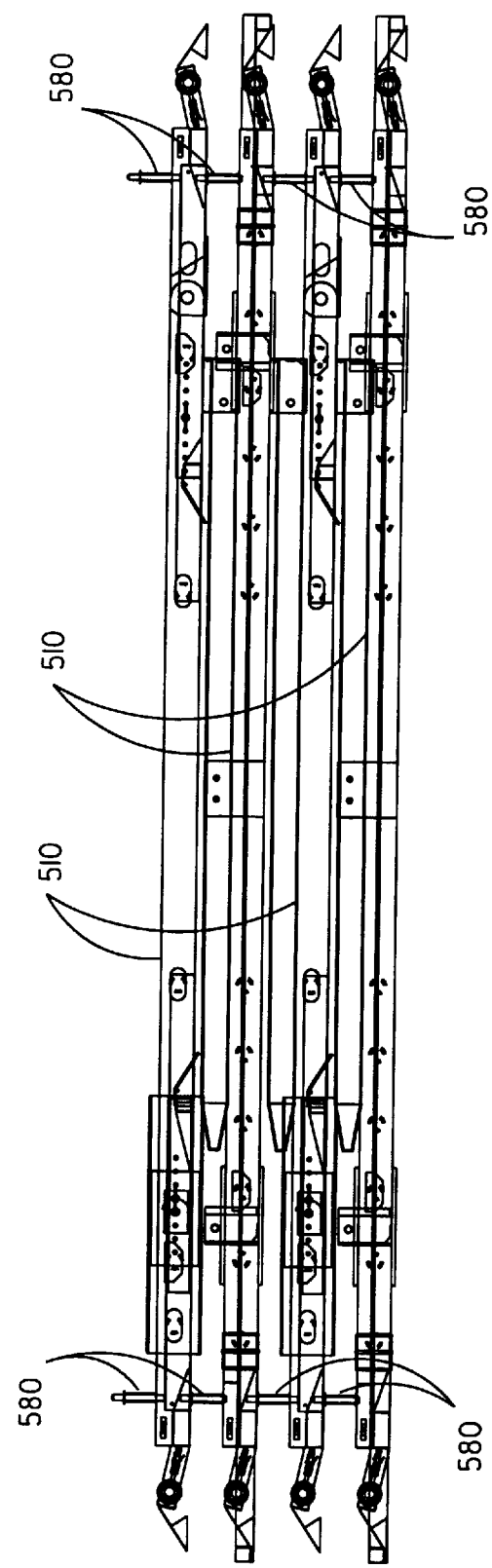
FIG. 44 is a side elevational view of a stack of pallets that are ready to be returned to a point of origination for reassembly and loading with cars.

When relatively elaborate equipment for handling loaded pallets is not available, each rack will be assembled and loaded with cars nearby a waiting highway trailer or an intermodal container. After each rack is assembled and loaded, it is pushed into the container. For example, FIG. 43 shows loaded racks that have been pushed one-by-one into a waiting highway truck/trailer TT by a fork lift truck FLT.

When a transporter carrying loaded racks 500 arrives at a destination, the loaded racks are removed from the transporter housing using, for example, a fork lift truck or a traction cable and winch. The cars are unloaded from the racks by reversing the procedure by which they were loaded, as described above. After the cars are unloaded from each rack, the rack may be disassembled by removing the braces 560 and the sleeves 561, lifting the upper pallet off the columns and releasing and pivoting the columns to the collapsed condition shown in FIG. 44. The pallets are configured to be stacked, mating pins 580 and sockets (formed by holes in the bottom walls of the side frame members, not shown) aligned with the pins 580 being provided. A fork lift truck can be used to move and stack the pallets as they are disassembled. The braces 560 lie on each lower pallet, which can include capturing cradles for them if desired, where they will be at hand when the pallets are unstacked and the racks reassembled after they have been returned to a destination for reloading. It is, of course, possible to leave the racks assembled, put them back in the transporter, and return them to the destination.

The racks 500 are well-suited for use with relatively more elaborate installations for loading and unloading. For example, a car assembly plant may have facilities for staging stacks of racks (FIG. 44), assembling the racks in the transport configuration (FIG. 41 C), and moving them to a loading station that has ramps or conveyors along which cars can be driven or conveyed directly onto the lower and upper pallets. Another possibility is to load each car on a pallet and assemble the rack after the cars are loaded on and secured to the pallets. The versatility of the rack of FIGS. 35 to 44 from the standpoint of methods of using it is a significant advantage. It can be used with relatively simple and low-cost loading and unloading facilities and as those facilities are upgraded used in modes adapted to the upgraded facilities. Also, the racks can be loaded at facilities that are relatively automated and unloaded at facilities that have only a loading dock or well for a highway trailer and a fork lift truck.

I claim:

1. A car transport rack for transporting cars comprising
    a lower pallet and an upper pallet, each pallet being adapted to support a car on its wheels and having side frame members, a front transverse frame member and a rear transverse frame member, the transverse frame members joining the side frame members;
    a front column attached to each of the side members of the lower pallet proximate to the front transverse frame member, the front columns being located transversely opposite each other with respect to the side frame members;
    a rear column attached to each of the side members of the lower pallet proximate to the rear transverse frame member, the rear columns being located transversely opposite each other with respect to the side frame members;
    an upper pallet front support bracket received by each front column for movement to a position selected from a plurality of positions above the lower pallet and coupled to the side frame member of the upper pallet for pivotal and sliding movement of the upper pallet relative to the front columns;
    an upper pallet rear support bracket received by each rear column for movement to a position selected from a plurality of positions above the lower pallet and coupled to the side frame member of the upper pallet for pivotal movement of the upper pallet relative to the front columns;
    means for securing each support bracket to the receiving column at the selected position; and
    a diagonal brace connected between each column and the side frame member of the lower pallet to which that column is attached, an upper end of each diagonal brace being connected to the column at a location above all of the positions to which the upper pallet support bracket is movable.

2. A car transport rack according to claim 1 wherein each pallet includes a wheel pan at each corner formed by junctures of the side frame members and end frame members.

3. A car transport rack according to claim 2 wherein the upper pallet has an opening defined by the side frame members and the wheel pans, which opening is adapted to receive an upper portion of a car on the lower pallet.

4. A car transport rack according to claim 3 wherein the upper pallet has a wheel way extending between the wheel pans and adjacent each side frame member for facilitating driving a car onto the lower pallet, the wheel ways bring removable to form portions of the opening.

5. A car transport rack according to claim 2 wherein the lower pallet includes a wheel way extending between the wheel pans and adjacent each side frame member for facilitating driving a car onto the lower pallet.

6. A car transport rack according to claim 1 wherein each column is attached to the side member of the lower pallet by a pivot coupling so that the column is collapsible.

7. A car transport rack according to claim 1 wherein the positions to which the upper pallet front mounting brackets are movable include loading/unloading positions in which the front end of the upper pallet rests on the front end of the lower pallet and the upper pallet is inclined upwardly toward the rear end.

8. A car transport rack according to claim 1 wherein the positions to which the upper pallet front and rear mounting brackets are movable include transport positions in which the upper pallet is inclined upwardly from the rear end toward the front end.

9. A car transport rack according to claim 1 wherein the upper and lower pallets having mating pins and sockets enabling the pallets to be stacked for transport without cars.

10. A method of transporting cars comprising the steps of providing a multiplicity of car transport racks, each rack having
    a lower pallet and an upper pallet, each pallet being adapted to support a car on its wheels and having side frame members, a front transverse frame member and a rear transverse frame member, the transverse frame members joining the side frame members,
    a front column attached to each of the side members of the lower pallet proximate to the front transverse frame member, the front columns being located transversely opposite each other with respect to the side frame members,
    a rear column attached to each of the side members of the lower pallet proximate to the rear transverse frame member, the rear columns being located transversely opposite each other with respect to the side frame members,
    an upper pallet front support bracket received by each front column for movement to a position selected from a plurality of positions above the lower pallet and coupled to the side frame member of the upper pallet for pivotal and sliding movement of the upper pallet relative to the front columns, an upper pallet rear support bracket received by each rear column for movement to a position selected from a plurality of positions above the lower pallet and coupled to the side frame member of the upper pallet for pivotal movement of the upper pallet relative to the front columns, means for securing each support bracket to the receiving column at the selected position, and a diagonal brace connected between each column and the side frame member of the lower pallet to which that column is attached, an upper end of each diagonal brace being connected to the column at a location above all of the positions to which the upper pallet support bracket is movable;

positioning the upper pallet of each rack on the columns in a loading/unloading position in which the front end of the upper pallet rests on the lower pallet and the upper pallet is inclined upwardly from the front end;

driving a first car onto the upper pallet of each rack and securing it to the upper pallet;

lifting the front end of the upper pallet of each rack upwardly and securing the front mounting brackets to the front columns in positions in which the upper pallet is inclined downwardly from front to rear; and driving a second car onto the lower pallet of each rack and securing it to the lower pallet.

11. A method of transporting cars according to claim 10 wherein each first car is driven onto the upper pallet rear end first and each second car is driven onto the lower pallet front end first.

12. A method of transporting cars according to claim 11 and further comprising the step of inserting a multiplicity of racks loaded with the first and second cars into a closed housing of a transporter selected from the group consisting of a rail car, an intermodal cargo container and a highway trailer.

13. A method of transporting cars according to claim 12 and further comprising the steps of moving the transporter to a destination, unloading the racks loaded with the first and second cars, driving the second car off the lower pallet of each rack, lowering the front end of the upper pallet of each rack until the front end rests on the lower pallet, and driving the first car off the upper pallet of each rack.

14. A method of transporting cars according to claim 13 and further comprising the step of disassembling the rack and stacking the pallets for transport.

* * * * *